United States Patent
Ida et al.

(10) Patent No.: US 9,867,222 B2
(45) Date of Patent: Jan. 9, 2018

(54) WIRELESS COMMUNICATION SYSTEM, WIRELESS COMMUNICATION METHOD, TRANSMISSION DEVICE, CONTROL METHOD, AND RECORDING MEDIUM

(71) Applicant: FUJITSU LIMITED, Kawasaki-shi, Kanagawa (JP)

(72) Inventors: Ichirou Ida, Yokohama (JP); Makoto Yoshida, Yokohama (JP); Masafumi Katoh, Yokohama (JP); Teruhisa Ninomiya, Yokohama (JP); Kazumi Kasai, Shibuya (JP); Tatsuya Kikuzuki, Sodegaura (JP)

(73) Assignee: FUJITSU LIMITED, Kawasaki (JP)

( * ) Notice: Subject to any disclaimer, the term of this patent is extended or adjusted under 35 U.S.C. 154(b) by 348 days.

(21) Appl. No.: 14/850,906

(22) Filed: Sep. 10, 2015

(65) Prior Publication Data
US 2016/0007401 A1    Jan. 7, 2016

Related U.S. Application Data

(63) Continuation of application No. PCT/JP2013/056764, filed on Mar. 12, 2013.

(51) Int. Cl.
*H04B 7/00* (2006.01)
*H04W 76/02* (2009.01)
(Continued)

(52) U.S. Cl.
CPC ......... *H04W 76/023* (2013.01); *H04W 40/34* (2013.01); *H04W 76/028* (2013.01); *H04W 84/18* (2013.01); *H04W 88/04* (2013.01)

(58) Field of Classification Search
USPC ....................................................... 455/500
See application file for complete search history.

(56) References Cited

U.S. PATENT DOCUMENTS

2010/0260042 A1* 10/2010 Kwon ................. H04B 7/2606
370/227
2011/0137133 A1*  6/2011 Espina Perez ...... G06F 19/3418
600/300
(Continued)

FOREIGN PATENT DOCUMENTS

JP          07-274232          10/1995
JP         2009-38677           2/2009
(Continued)

OTHER PUBLICATIONS

Feng Shu et al., "IMEC Ultra-wide Band MAC Proposal for IEEE 802.15.6, IEEE 802.15-09/0332r0, IEEE mentor", pp. 1-18 of Feng Shu, Dries Neirynck, Olivier Rosseaux, IMEC, May 4, 2009. [Cited in JPOA].

(Continued)

*Primary Examiner* — Ankur Jain
(74) *Attorney, Agent, or Firm* — Fujitsu Patent Center

(57) ABSTRACT

A wireless communication system includes a transmission device, a relay device, and a reception device and is configured to execute direct communication of directly transmitting a wireless signal from the transmission device to the reception device without routing through the relay device and indirect communication of indirectly transmitting a wireless signal from the transmission device to the reception device through the relay device. The wireless communication system includes a controller configured to estimate a disconnection continuation time that is a time during which the direct communication is not executable in a case where the direct communication is not executable while the direct communication is repeatedly executed, continue to execute the direct communication when the disconnection continuation time is shorter than a threshold time, and execute the (Continued)

indirect communication when the disconnection continuation time is longer than the threshold time.

19 Claims, 13 Drawing Sheets

(51) Int. Cl.
*H04W 40/34* (2009.01)
*H04W 84/18* (2009.01)
*H04W 88/04* (2009.01)

(56) References Cited

U.S. PATENT DOCUMENTS

| | | | | |
|---|---|---|---|---|
| 2011/0269414 | A1* | 11/2011 | Falck | A61B 5/0028 455/100 |
| 2011/0280224 | A1* | 11/2011 | Falck | H04W 72/1215 370/336 |
| 2011/0317556 | A1* | 12/2011 | Hiehata | H04L 47/11 370/230.1 |
| 2012/0250546 | A1* | 10/2012 | Hamida | H04L 12/2602 370/252 |

FOREIGN PATENT DOCUMENTS

| | | |
|---|---|---|
| JP | 2011-508994 | 3/2011 |
| JP | 2011-526498 | 10/2011 |
| JP | 2012-10258 | 1/2012 |
| JP | 2012-500084 | 1/2012 |
| JP | 2012-513698 | 6/2012 |
| JP | 2012-517135 | 7/2012 |
| JP | 2012-178720 | 9/2012 |
| JP | 2012-222812 | 11/2012 |
| WO | 2009/138883 | 11/2009 |

OTHER PUBLICATIONS

JPOA—Japanese Office Action dated Dec. 6, 2016 for corresponding Japanese Patent Application No. 2015-505120, with partial English translation. ** JP2012-178720 cited in JPOA was previously submitted in the IDS filed on Sep. 10, 2015.

J.G. Proakis, "Digital communications", Chapter 5: Optimum Receivers For the Additive White Gaussian Noise Channel, 4th Ed., McGraw Hill (15 pages).

Satoshi Yamazaki et al., "Progress of Digital Wireless Communication Technology: Fading Phenomenon and Changes in Compensation Technology", Journal of Electrical Engineers of Japan. C, IEEJ Transactions on Electronics, Information and Systems, vol. 132, Issue No. 5, pp. 675-685, May 2012, with English Abstract (11 pages).

International Search Report, mailed in connection with PCT/JP2013/056764 and dated Jun. 11, 2013 (2 pages).

* cited by examiner

RELATED ART

WIRELESS COMMUNICATION SYSTEM, WIRELESS COMMUNICATION METHOD, TRANSMISSION DEVICE, CONTROL METHOD, AND RECORDING MEDIUM

CROSS-REFERENCE TO RELATED APPLICATION

This application is a continuation application of International Application PCT/JP2013/056764, filed on Mar. 12, 2013 and designated the U.S., the entire contents of which are incorporated herein by reference.

FIELD

The present disclosure relates to a wireless communication system, a wireless communication method, a transmission device, a control method, and a recording medium.

BACKGROUND

A first wireless communication system including a transmission device and a reception device is known. In the first wireless communication system, the transmission device repeatedly transmits a wireless signal to the reception device. In the first wireless communication system, for example, as the transmission device moves, there are cases where communication between the transmission device and the reception device is not temporarily executable due to presence of an obstacle.

Thus, a second wireless communication system 900 disclosed in Patent Literature 1 (Japanese National Publication of International Patent Application No. 2012-500084) and Patent Literature 2 (Japanese National Publication of International Patent Application No. 2012-513698), as illustrated in FIG. 1, includes a transmission device 901, a reception device 902, and a relay device 903 and is configured to execute direct communication and indirect communication. The direct communication is communication for directly transmitting a wireless signal from the transmission device 901 to the reception device 902 not through the relay device 903. On the other hand, the indirect communication is communication for indirectly transmitting a wireless signal from the transmission device 901 to the reception device 902 through the relay device 903. Each of the transmission device 901 and the relay device 903 is mounted to a human body BD.

Accordingly, even in a case where the direct communication is not executable, the second wireless communication system 900 can transfer a wireless signal from the transmission device 901 to the reception device 902 by executing the indirect communication. In other words, it can be avoided that a time during which the reception device 902 can not receive a wireless signal from the transmission device 901 becomes excessively long.

SUMMARY

For example, as in a mobile communication network, a body area network (BAN), or the like, there are cases where communication between the transmission device and the reception device is temporarily not executable at a relatively high frequency due to movement of the reception device, the transmission device, or an obstacle. In such a case, in the second wireless communication system 900, there is concern that the amount of power (power consumption) consumed by the relay device 903 may be excessively large.

According to one aspect, there is provided a wireless communication system that includes a transmission device, a relay device, and a reception device and is configured to execute direct communication of directly transmitting a wireless signal from the transmission device to the reception device without routing through the relay device and indirect communication of indirectly transmitting a wireless signal from the transmission device to the reception device through the relay device.

In addition, the wireless communication system includes a controller configured to estimate a disconnection continuation time that is a time during which the direct communication is not executable in a case where the direct communication is not executable while the direct communication is repeatedly executed, continue to execute the direct communication when the disconnection continuation time is shorter than a threshold time, and execute the indirect communication when the disconnection continuation time is longer than the threshold time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

<Related Art>

Figure 1:
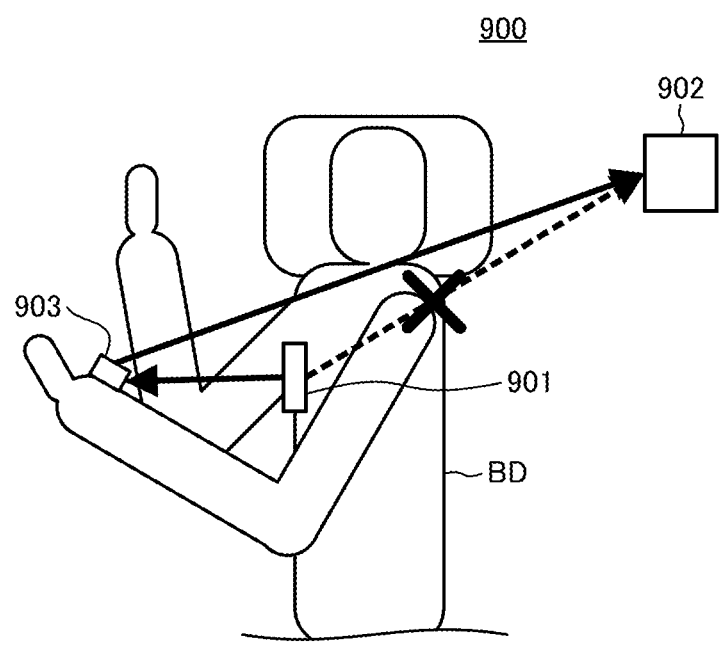
FIG. 1 is a diagram that illustrates the configuration of a wireless communication system according to a related art.

A wireless communication system constituting a BAN is frequently used for monitoring patient's biological information. In such a case, a transmission device acquiring the biological information is mounted to each portion of the patient's body. The transmission device constitutes a sensor node. In addition, a reception device collecting the biological information constitutes a hub.

The transmission device is mounted to be in tight contact with a human body, and thus, the transmission device is preferably configured to be small. For this reason, the transmission device is frequently driven by a small battery having a relatively small capacity. Accordingly, it is preferable that the transmission device has low power consumption.

Meanwhile, in a case where a patient turns over in a state of lying down on a bed or the like, there are cases where a non-line-of-sight (NLOS) state is formed due to the patient's body blocking a communication channel between the transmission device and the reception device. In the non-line-of-sight state, since the power of a wireless signal received by the reception device is very low, the communication between the transmission device and the reception device is frequently disconnected.

Thus, in the non-line-of-sight state, even in a case where an abnormality of the biological information is detected, and an alarm used for giving a notification thereof is transmitted by the transmission device, when the reception device can not receive a wireless signal, the transfer of the alarm to a medical worker (for example, a doctor, a nurse, or the like) is excessively delayed. As a result, a treatment for the patient is excessively delayed. For this reason, it is necessary to avoid excessively lengthening of a time during which the reception device can not receive a wireless signal from the transmission device.

Thus, it is considered to be suitable to relay a wireless signal transmitted by the transmission device by using a relay device and transfer the wireless signal to the reception device by using another sensor node acquiring the biological information as the relay device.

Meanwhile, when a wireless signal is relayed, the relay device needs to execute both a process of receiving the wireless signal from the transmission device and a process of transmitting the received wireless signal to the reception device. For this reason, the amount of power (power consumption) consumed by the relay device for relaying a wireless signal is larger than that of power consumed by the transmission device for transmitting a wireless signal. In other words, there is concern that the power consumption of the relay device is excessively high.

As a non-line-of-sight state time per unit time increases, the power consumption of the relay device increases. Thus, in a case where the non-line-of-sight state time per unit time is relatively long, there is concern that the relay device can not continuously operate at a time point before a time point at which the transmission device can not continuously operate.

In such a case, not only the biological information acquired by the relay device can not be monitored, but also the relay of a wireless signal transmitted by the transmission device in the non-line-of-sight state can not be executed. Accordingly, in such a case, the biological information acquired by the transmission device can not be monitored, whereby the function of the BAN can not be appropriately realized.

Thus, it is considered to be suitable to cause the power consumption of the relay device and the power consumption of the transmission device to sufficiently approach each other. In addition, it is considered to be suitable to cause the operation continuation time (a time during which the operation can be continued) of the relay device and the operation continuation time of the transmission device to sufficiently approach each other.

In order to address at least one of the above-described problems, hereinafter, a wireless communication system, a wireless communication method, a transmission device, a control method, and a control program according to embodiments of the present disclosure will be described with reference to FIGS. 2 to 13.

First Embodiment (Overview)

A wireless communication system according to a first embodiment constitutes a body area network (BAN). The wireless communication system includes a transmission device, a relay device, and a reception device. The wireless communication system is configured to execute direct communication and indirect communication.

The direct communication is communication for directly transmitting a wireless signal from the transmission device to the reception device not through the relay device. On the other hand, the indirect communication is communication for indirectly transmitting a wireless signal from the transmission device to the reception device through the relay device.

In a case where the direct communication is not executable while the direct communication is repeatedly executed, the wireless communication system estimates a disconnection continuation time that is a time during which the non-executable state of the direct communication is continued. When the disconnection continuation time is shorter than a certain threshold time, the wireless communication system continues to execute the direct communication. On the other hand, when the disconnection continuation time is longer than the threshold time, the wireless communication system executes the indirect communication.

Meanwhile, there are cases where the state in which the direct communication is not executable ends within a relatively short allowed delay time (for example, within one second, within several seconds to several tens of seconds, or the like). In such cases, also when the execution of the direct communication is continued without executing the indirect communication, a probability of successful execution of the direct communication is relatively high.

Figure 2:
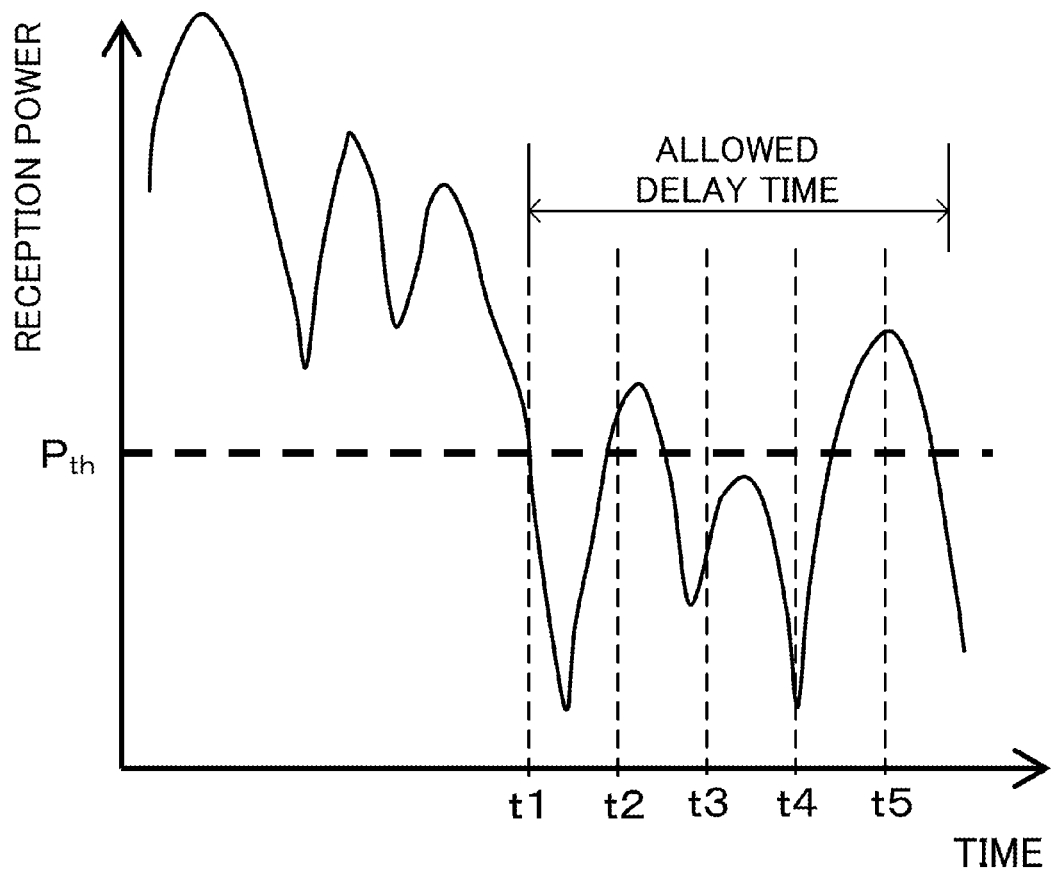
FIG. 2 is a graph that illustrates an example of a change in reception power with respect to time.

For example, as illustrated in FIG. 2, a case will be considered in which power (reception power) received by the reception device becomes less than threshold power $P_{th}$ at a time point t1. Here, the threshold power $P_{th}$ is a reference value set in advance for enabling the execution of communication. In this case, according to a change in the reception power in time that is generated by fading, at time points t2 and t5, the reception power is higher than the threshold power $P_{th}$. Thus, in a case where the direct communication is executed at the time points t2 and t5, the execution of the direct communication is successful.

However, it is difficult to estimate timing at which the reception power is higher than the threshold power $P_{th}$ with relatively high accuracy. Thus, in this example, in a case where the disconnection continuation time is shorter than a threshold time, the wireless communication system repeatedly executes a retransmission process when the number of times of retransmission is an upper limit number of times of retransmission or less. Here, the retransmission process is a process of re-executing direct communication when the execution of the direct communication fails. In addition, the number of times of retransmission is the number of times of repeatedly executing the retransmission process.

Thus, in a case where the state in which the direct communication is not executable ends within a relatively short allowed delay time, even when the execution of the direct communication is continued without executing the indirect communication, the execution of the direct communication is successful at a relatively high probability. In other words, it can be prevented that the time during which a wireless signal can not be received from the transmission device by the reception device becomes excessively long.

In this way, according to the wireless communication system configured as above, unnecessary execution of the indirect communication can be prevented. In other words, according to the above-described configuration, it can be avoided that the power consumption of the relay device becomes excessively high while the time during which a wireless signal transmitted from the transmission device can not be received by the reception device is shortened.

Hereinafter, the first embodiment will be described in detail.

(Configuration)

Figure 3:
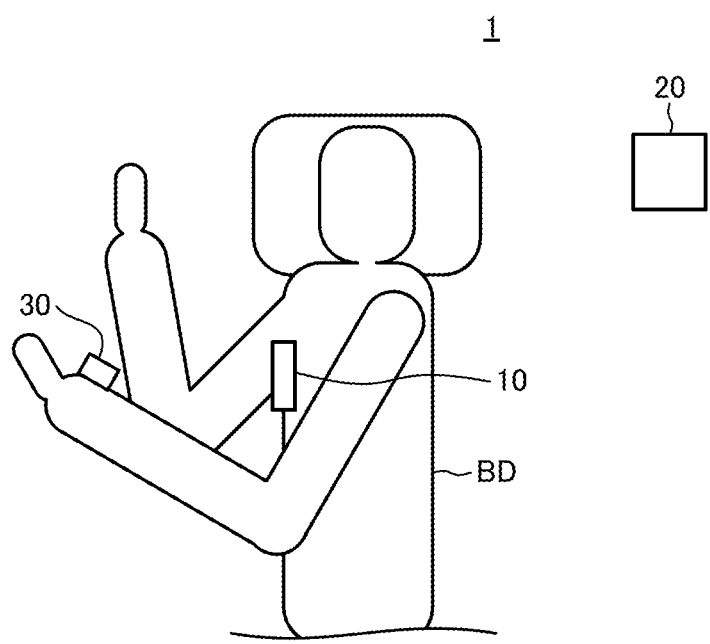
FIG. 3 is a diagram that illustrates the configuration of a wireless communication system as an example of a first embodiment.

As illustrated in FIG. 3, a wireless communication system 1 according to the first embodiment includes a transmission device 10, a reception device 20, and a relay device 30. In the wireless communication system 1, the number of at least one of the transmission devices 10, the reception devices 20, and the relay devices 30 may be two or more.

The wireless communication system 1 constitutes a BAN. The wireless communication system 1 may constitute a wireless communication network other than the BAN such as a wireless sensor network (WSN) or a mobile communication network. Furthermore, the wireless communication system 1 may be configured to execute multi-hop communication by constituting a wireless ad hoc network.

Each (each device) of the transmission device 10, the reception device 20, and the relay device 30 is configured to execute wireless communication with another device located in a range (for example, a range in which the power (reception power) of a received wireless signal is a specific (predetermined) reference value or more) in which a wireless signal can be transmitted and received.

In this example, each of the transmission device 10 and the relay device 30 includes a battery and is driven by power supplied from the battery. Here, the battery may be a storage battery (secondary cell). In addition, the reception device 20 is driven by power supplied through a power network not illustrated in the figure. Each of the transmission device 10 and the relay device 30 is mounted to a patient's body BD.

Each of the transmission device 10 and the relay device 30 detects a physical quantity and transmits a data signal that is a wireless signal representing the detected physical quantity to the reception device 20. In this example, the physical quantity represents biological information.

In this example, the transmission device 10 includes an electrocardiogram (ECG) sensor. In other words, the transmission device 10 detects an electrical signal (for example, a change in the voltage, the current, or the like with respect to time) representing the function of a heart action as the physical quantity. In this example, the transmission device 10 is mounted on the chest of the patient's body BD.

In addition, the relay device 30 includes a saturation of peripheral oxygen ($SpO_2$) sensor. In other words, the relay device 30 detects an amount of oxygen contained in the blood as a physical quantity. In this example, the relay device 30 is mounted in the wrist, a finger, or the like of the patient's body BD.

The reception device 20 receives a data signal transmitted from each of the transmission device 10 and the relay device 30. The reception device 20 stores a physical quantity represented by the received data signal. The reception device 20 may be configured to transmit the physical quantity to an information processing device, which is not illustrated in the figure, connected through a communication network not illustrated in the figure.

Furthermore, the reception device 20 may be configured to output an alarm (for example, generate an alarm sound and/or turn on an alarm lamp) in a case where the physical quantity satisfies a certain condition. In addition, in a case where the physical quantity satisfies a certain condition, the reception device 20 may be configured to make a call to a certain phone number or transmit certain alarm information to a certain information processing device.

The transmission device 10 is configured to execute direct communication and indirect communication. The direct communication is communication for directly transmitting a wireless signal to the reception device 20 not through the relay device 30. The indirect communication is communication for indirectly transmitting a wireless signal to the reception device 20 through the relay device 30. In a case where the direct communication is executed, the transmission device 10 transmits the wireless signal including information representing the execution of the direct communication. Similarly, in a case where the indirect communication is executed, the transmission device 10 transmits the wireless signal including information representing the execution of the indirect communication.

In a case where a wireless signal transmitted by the transmission device 10 is received, the relay device 30 transmits (transfers) the received wireless signal to the reception device 20 when the received wireless signal includes the information representing the execution of the indirect communication. On the other hand, in a case where a wireless signal transmitted by the transmission device 10 is received, the relay device 30 does not transmit the received wireless signal when the received wireless signal includes the information representing the execution of the direct communication.

Figure 4:
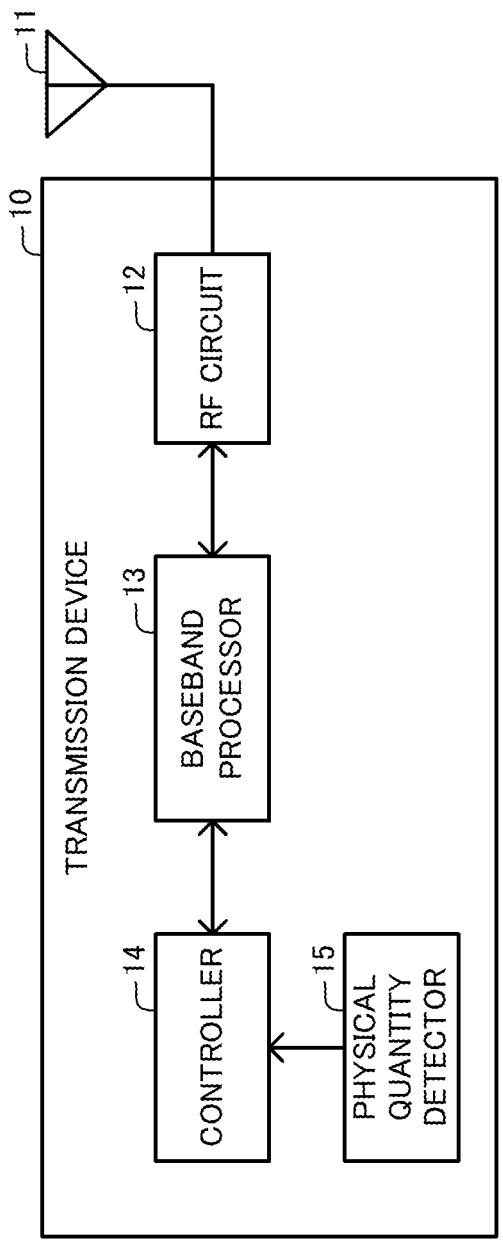
FIG. 4 is a diagram that illustrates the configuration of a transmission device as an example of the first embodiment.

As illustrated in FIG. 4, the transmission device 10 includes an antenna 11, a radio frequency (RF) circuit 12, a baseband processor 13, a controller 14, and a physical quantity detector 15.

The antenna 11 transmits an electrical signal as a wireless signal (electric wave) to an external space and receives a wireless signal in the external space as an electrical signal.

The RF circuit 12 amplifies a signal (radio frequency (RF) signal) received by the antenna 11. In addition, the RF circuit 12 executes a frequency conversion (down conversion) of the amplified RF signal into a baseband frequency and outputs a signal after the frequency conversion to the baseband processor 13 as a baseband (BB) signal.

Furthermore, the RF circuit 12 executes a frequency conversion (up conversion) of the BB signal output by the baseband processor 13 into a radio frequency, amplifies the signal (RF signal) after the frequency conversion, and outputs the amplified RF signal to the antenna 11.

The baseband processor 13 executes baseband processing including processes such as coding and modulation for the transmission signal from the controller 14. The baseband processor 13 outputs the BB signal after the baseband processing to the RF circuit 12.

In addition, the baseband processor 13 executes baseband processing including processes such as decoding and demodulation for the BB signal from the RF circuit 12. The baseband processor 13 outputs a reception signal after the baseband processing to the controller 14.

The physical quantity detector 15 detects (measures) a physical quantity. In this example, the physical quantity detector 15 is an ECG sensor. In other words, the physical quantity detector 15 detects an electrical signal (for example, a change in the voltage, the current, or the like with respect to time) representing a heart action as a physical quantity. Every time when the physical quantity is detected, the physical quantity detector 15 outputs physical quantity information representing the detected physical quantity to the controller 14.

In this example, the physical quantity detector 15 detects a physical quantity every time when a first detection period (for example, 200 [ms]) set in advance elapses. Alternatively, the physical quantity detector 15 may be configured to detect a physical quantity every time when the transmission device 10 receives a certain detection request.

In this example, the data amount of the physical quantity information output by the physical quantity detector 15 for every unit time is 10 kbps (kilobits per second).

The controller 14 outputs a transmission signal including the physical quantity information output by the physical quantity detector 15 and the information representing the execution of the direct communication to the baseband processor 13, thereby executing the direct communication. In addition, the controller 14 outputs a transmission signal including the physical quantity information output by the physical quantity detector 15 and the information representing the execution of the indirect communication to the baseband processor 13, thereby executing the indirect communication.

In this example, the controller 14 executes the direct communication every time when first transmission timing comes. In this example, the first transmission timing is timing that comes repeatedly every time when the first detection period elapses. In other words, the controller 14 repeatedly executes the direct communication.

After the execution of the direct communication, in a case where an acknowledgement (ACK) signal for the direct communication is received until a certain ACK standby time elapses, the controller 14 continues to execute the direct communication. The ACK signal is a wireless signal that is transmitted by the reception device 20 and represents a successful execution of the direct communication.

In this example, in a period from the reception of the ACK signal to a time point when the first transmission timing comes, the controller 14 sets the state of the transmission device 10 to a sleep state. The sleep state is a state in which the power consumption of the transmission device 10 is lower than that of a normal state. For example, in the normal state, the transmission device 10 supplies power to all the circuits constituting the transmission device 10. On the other hand, in the sleep state, the transmission device 10 supplies power to only some of the circuits.

In a case where an ACK signal for the direct communication has not been received until the ACK standby time elapses after the execution of the direct communication (in other words, in a case where the execution of the direct communication fails or in a case where the direct communication is not executable), the controller 14 executes a following determination process. In this example, a case where the ACK signal is not received includes a case where the power of the received ACK signal is lower than the threshold power $P_{th}$.

The determination process is a process of estimating a disconnection continuation time and determining whether or not the estimated disconnection continuation time is shorter than a certain threshold time. Here, the disconnection continuation time is a time during which the direct communication is not executable. In this example, the threshold time is represented also as an allowed delay time.

In this example, the controller 14 stores the threshold time in advance. Alternatively, the controller 14 may be configured to use a value acquired by adding a certain margin to a basic threshold time stored in advance or subtracting a certain margin from the basic threshold time as the threshold time. Here, it is suitable to determine the margin based on a standard deviation of the disconnection continuation time estimated in the past.

In this example, the controller 14 uses a constant value as the threshold time. Alternatively, the controller 14 may use a variable value as the threshold time. In such a case, the controller 14 may update the threshold time based on at least one of the disconnection continuation time estimated in the past and the number of times of retransmission in the past. Alternatively, the controller 14 may be configured to store a plurality of mutually-different threshold times and execute the determination process by using a threshold time selected according to the disconnection continuation time estimated in the past.

In this example, as the disconnection continuation time, the controller 14 uses an average fade duration (AFD). Under an assumption that the reception power is distributed according to a Rayleigh distribution due to multiple reflection of electric waves, the average fade duration is an average value of time during which the reception power is lower than a certain threshold power when the average value of the reception power and a Doppler frequency are given. Here, the Doppler frequency is a Doppler frequency relating to a change in the reception power according to the fading. Alternatively, the controller 14 may use a parameter other than the average fade duration as the disconnection continuation time.

For example, the controller 14, as represented in Mathematical Formulas 1 and 2, calculates the average fade duration $\tau$ based on the Doppler frequency $f_d$, the average reception power $P_{rave}$, and the threshold power $P_{th}$.

$$\tau = \frac{e^{\rho^2} - 1}{\rho \cdot f_d \sqrt{2\pi}}$$ [Mathematical Formula 1]

$$\rho = \sqrt{\frac{P_{th}}{P_{rave}}}$$ [Mathematical Formula 2]

Here, the threshold power $P_{th}$ is a reference value that is set in advance for enabling the execution of communication. In other words, as will be described later, in a case where the power (reception power) of a received wireless signal is lower than the threshold power $P_{th}$, the reception device 20 determines that the execution of communication relating to the wireless signal fails. On the other hand, in a case where the reception power is higher than the threshold power $P_{th}$, the reception device 20 determines that the execution of communication relating to the wireless signal is successful. In this example, the controller 14 stores the threshold power $P_{th}$ in advance.

In addition, the Doppler frequency $f_d$, as will be described later, is represented by Doppler frequency information that is included in the ACK signal transmitted by the reception device 20. Alternatively, the wireless communication system 1 may be configured such that the transmission device 10 estimates the Doppler frequency $f_d$ based on a change in the reception power of the ACK signal, which is transmitted by the reception device 20, with respect to time.

Here, the average reception power $P_{rave}$ is a value that is estimated as an average value of the reception power during a period in which the direct communication is not executable. In this example, the controller 14 estimates the average reception power $P_{rave}$ based on the reception power for a certain period (for example, a period starting from one second before a time point at which the direct communication becomes not executable to 0.5 seconds after the time point or the like) including a time point at which the direct communication becomes not executable and a change rate (a change rate of the reception power in time) of the reception power with respect to time for the period. For example, the controller 14 may generate a table in which reception power, a change rate of the reception power in time, and the average reception power are associated with each other based on an experimental rule in advance and estimate the average reception power $P_{rave}$ based on the table.

As above, the controller 14 calculates an average fade duration and estimates the calculated average fade duration as the disconnection continuation time.

Then, in the determination process described above, the controller 14 determines whether or not the estimated disconnection continuation time is shorter than the threshold time.

In a case where the estimated disconnection continuation time is shorter than the threshold time, the controller 14 executes a direct communication continuation process. On the other hand, in a case where the estimated disconnection continuation time is longer than the threshold time, the controller 14 executes the indirect communication.

The direct communication continuation process is a process of continuing to execute the direct communication. In this example, the direct communication continuation process is a process of determining the number of times of retransmission and repeatedly executing a retransmission process when the number of times of retransmission is the determined upper limit number of times of retransmission or less. The retransmission process is a process of re-executing the direct communication when the execution of the direct communication fails. Here, the number of times of retransmission is the number of times of repeatedly executing the retransmission process. The process of determining the upper limit number of times of retransmission will be described in detail later.

In the direct communication continuation process, the controller 14 executes the retransmission process every time when second transmission timing comes. In this example, the second transmission timing is timing that repeatedly comes every time when a retransmission period having the same length as that of the first detection period elapses. In other words, the controller 14 repeatedly executes the retransmission process. Alternatively, the retransmission period may have a length that is different from that of the first detection period.

In the direct communication continuation process, the controller 14 executes the indirect communication in a case where the number of times of retransmission is larger than the upper limit number of times of retransmission.

Next, the process of determining the upper limit number of times of retransmission will be described in detail.

For each of a plurality of candidate values that are candidates for the upper limit number of times of retransmission, the controller 14 estimates first power consumption and second power consumption of a case where the upper limit number of times of retransmission is the candidate value. The first power consumption is the amount of power consumed by the relay device 30. The second power consumption is the amount of power consumed by the transmission device 10.

In this example, the candidate values are natural numbers starting from a lower limit candidate value 1 to an upper limit candidate value $M_{max}$. Here, it is suitable to set the upper limit candidate value $M_{max}$ in advance based on the allowed delay time and the retransmission period. For example, in a case where the allowed delay time is one second, and the retransmission period is 200 [ms], the upper limit candidate value $M_{max}$ may be set to "5" when the retransmission process is executable within a sufficiently short time, and the upper limit candidate value $M_{max}$ may be set to "4" when a time required for executing the retransmission process is several tens of microseconds.

Then, the controller 14 determines a candidate value for which a difference between the first power consumption and the second power consumption is minimal as the upper limit number of times of retransmission.

For example, first, the controller 14 acquires a signal-to-noise ratio (SNR) of communication between the transmission device 10 and the reception device 20 and an SNR of communication between the transmission device 10 and the relay device 30.

In this example, the controller 14 acquires the SNR of the communication between the transmission device 10 and the reception device 20 based on the power (reception power) of an ACK signal, which is transmitted from the reception device 20, received by the transmission device 10. Alternatively, the wireless communication system 1 may be configured such that the reception device 20 acquires an SNR based on the wireless signal transmitted from the transmission device 10, and the transmission device 10 receives information representing the SNR from the reception device 20.

In addition, in this example, the controller 14 acquires an SNR of the communication between the transmission device 10 and the relay device 30 based on the power (reception power) of a polling (POLL) signal to be described later which is transmitted from the relay device 30 and is received by the transmission device 10. Alternatively, the wireless communication system 1 may be configured such that the relay device 30 acquires an SNR based on the wireless signal transmitted from the transmission device 10, and the transmission device 10 receives information representing the SNR from the relay device 30.

The controller 14 acquires a bit error rate (ratio) (BER) based on a relation between the SNR and the BER and the acquired SNR. The BER is a probability that an error occurs in the bit. As the relation described above, the controller 14 uses a relation set in advance based on an experimental rule or a theoretical equation. For example, the relation between SNR and the BER for each modulation scheme is described in Non-Patent Literature 1.

[Non-Patent Literature 1]

J. G. Proakis, "Digital communications", 4th Ed., Chapter 5, McGraw Hill

In addition, the controller 14 acquires a packet error rate (ratio) (PER) based on the acquired BER. The PER is a probability that an error occurs in one or more bits of a bit stream constituting a packet. In other words, the PER is acquired by subtracting a probability that none of the bits are erroneous in the bit stream constituting a packet from one.

When the length (in other words, the number of bits) of the bit stream constituting a packet is z, a probability that none of the bits of the bit stream constituting a packet is erroneous can be represented as $(1-BER)^z$. Accordingly, the PER is represented by Mathematical Formula 3. In this example, z is the number of bits included in a data signal.

$$PER = 1 - (1-BER)^z \quad \text{[Mathematical Formula 3]}$$

In this way, the controller 14 acquires the PER of the communication between the transmission device 10 and the reception device 20 and the PER of the communication between the transmission device 10 and the relay device 30.

In a case where the upper limit number of times of retransmission is assumed to be N, an expected value $E_d$ of the number of times of transmitting a wireless signal (number of times of transmission) that is executed by the transmission device 10 in the direct communication continuation process is represented by Mathematical Formula 4. In addition, in a case where the upper limit number of times of retransmission is assumed to be N, an expected value $E_r$ of a sum of the number of times of receiving a wireless signal (the number of times of reception) and the number of times of transmitting a wireless signal (the number of times of transmission) in the relay device 30 in the direct communication continuation process is represented by Mathematical Formula 5. Methods for deriving Mathematical Formula 4 and Mathematical Formula 5 will be described later.

$$E_d = \sum_{n=0}^{N} x^n + \frac{x^{N+1}}{1-x'} \quad \text{[Mathematical Formula 4]}$$

$$E_r = \frac{2x^{N+1}}{1-x'} \quad \text{[Mathematical Formula 5]}$$

Here, x is the PER of the communication between the transmission device 10 and the reception device 20. In addition, x' is the PER of the communication between the transmission device 10 and the relay device 30.

The controller 14 stores power consumption for each transmission process of the transmission device 10, power consumption for each reception process of the relay device 30, and power consumption for each transmission process of the relay device 30 in advance. The power consumption for each transmission process of the transmission device 10 is the amount of power consumed for transmitting a wireless signal once in the transmission device 10. The power consumption for each reception process of the relay device 30 is the amount of power consumed for receiving a wireless signal once in the relay device 30. The power consumption for each transmission process of the relay device 30 is the amount of power consumed for transmitting a wireless signal once in the relay device 30.

The controller 14 acquires the first power consumption by multiplying the expected value $E_d$ of the number of times of transmission for the transmission device 10 by the power consumption for each transmission process of the transmission device 10. In addition, the controller 14 acquires the second power consumption by multiplying the expected value $E_r$ of the sum of the number of times of reception and the number of times of transmission for the relay device 30 by an average value of the power consumption for each reception process of the relay device 30 and the power consumption for each transmission process of the relay device 30.

Alternatively, the wireless communication system 1 may be configured to measure the power consumption for each transmission process of the transmission device 10, the power consumption for each reception process of the relay device 30, and the power consumption for each transmission process of the relay device 30 and acquire the first power consumption and the second power consumption based on the measured values.

Next, the methods for deriving Mathematical Formula 4 and Mathematical Formula 5 will be described.

A probability of executing the indirect communication as the execution of the direct communication fails is x. In addition, in a case where the indirect communication is executed as the execution of the direct communication fails, a probability that the execution of the indirect communication is successful is $x/(1-x')$. Thus, in a case where the upper limit number of times of retransmission is assumed to be "0" (in other words, the indirect communication is executed immediately when the direct communication becomes not executable), the expected value $E_d$ of the number of times of transmission for the transmission device 10 is represented by Mathematical Formula 6.

$$E_d = 1 + \frac{x}{1-x'} \quad \text{[Mathematical Formula 6]}$$

In this example, it is assumed that the communication between the relay device 30 and the reception device 20 is necessarily successful. Meanwhile, the relay device 30 receives a wireless signal from the transmission device 10 and transmits the wireless signal, and accordingly, the expected value $E_r$ of the sum of the number of times of reception and the number of times of transmission for the relay device 30 is represented by Mathematical Formula 7.

$$E_r = \frac{2x}{1-x'} \quad \text{[Mathematical Formula 7]}$$

Similarly, in a case where the upper limit number of times of retransmission is assumed to be "1", the expected value $E_d$ of the number of times of transmission for the transmission device 10 is represented by Mathematical Formula 8. In addition, in such a case, the expected value $E_r$ of the sum of the number of times of reception and the number of times of transmission for the relay device 30 is represented by Mathematical Formula 9.

$$E_d = 1 + x + \frac{x^2}{1-x'} \quad \text{[Mathematical Formula 8]}$$

$$E_r = \frac{2x^2}{1-x'} \quad \text{[Mathematical Formula 9]}$$

Based on the description presented above, by generalizing Mathematical Formula 6 to Mathematical Formula 9 so as to set the upper limit number of times of retransmission to N, Mathematical Formula 4 and Mathematical Formula 5 are derived.

Figure 5:
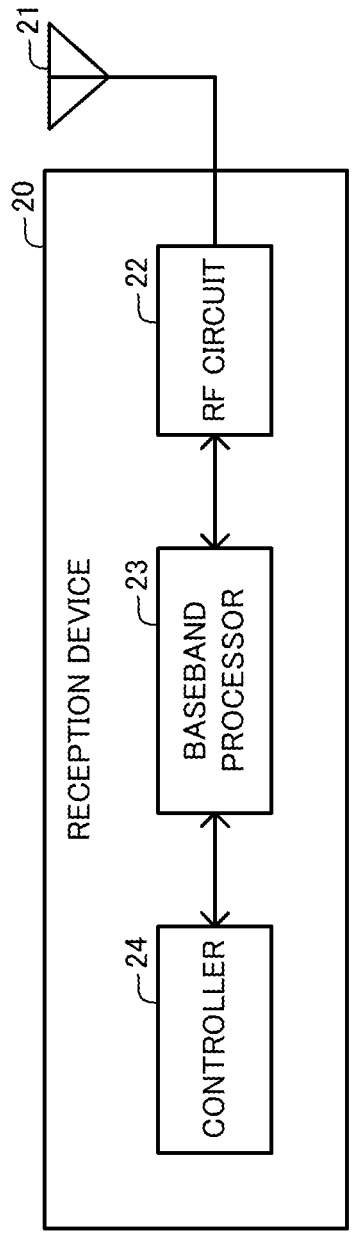
FIG. 5 is a diagram that illustrates the configuration of a reception device as an example of the first embodiment.

Next, as illustrated in FIG. 5, the reception device 20 includes an antenna 21, an RF circuit 22, a baseband processor 23, and a controller 24. The configurations of the antenna 21, the RF circuit 22, and the baseband processor 23 are respectively similar to those of the antenna 11, the RF circuit 12, and the baseband processor 13.

In a case where a wireless signal transmitted from each of the transmission device 10 and the relay device 30 is received, the controller 24 executes an ACK transmission process when the power (reception power) of the received wireless signal is higher than the threshold power $P_{th}$. The ACK transmission process is a process of outputting a transmission signal to the baseband processor 23 so as to transmit an ACK signal to a device that is the transmission source of the wireless signal. On the other hand, in a case where a wireless signal transmitted from each of the transmission device 10 and the relay device 30 is received, when the reception power is lower than the threshold power $P_{th}$, the controller 24 does not execute the ACK transmission process.

The controller 24 acquires reception power of a case where a wireless signal transmitted by the transmission device 10 is received and stores the acquired reception power. Every time reception power is acquired, the controller 24 acquires a Doppler frequency $f_d$ according to a change in the reception power based on the stored reception power.

For example, the controller 24 acquires the Doppler frequency $f_d$ by applying a Fourier transform to a change in the reception power with respect to time. The controller 24 uses a relation set in advance based on an experimental rule or a theoretical equation as a relation between the spectrum of the reception power and the Doppler frequency. For example, an example of the relation described above is described in Non-Patent Literature 2. Alternatively, the controller 24 may be configured to acquire the Doppler frequency $f_d$ by counting the number of times of intersection between the reception power and a certain threshold power.

[Non-Patent Literature 2]
S. Yamazaki and David K. Asano, "Progress of Digital Wireless Communication Technology: Fading Phenomenon and Changes in Compensation Technology", Journal of Electrical Engineers of Japan. C, IEEJ Transactions on Electronics, Information and Systems, vol. 132, Issue No. 5, p. 675-685, May, 2012

The controller 24 outputs a transmission signal to the baseband processor 23 so as to transmit the Doppler frequency information representing the acquired Doppler frequency $f_d$ as well when an ACK signal is transmitted. In this example, the ACK signal includes the Doppler frequency information. Alternatively, the reception device 20 may be configured to transmit the Doppler frequency information as a wireless signal other than the ACK signal.

It is known that the Doppler frequency $f_d$ is in inverse proportion to a wavelength corresponding to the frequency of a wireless signal and is in proportion to the speed of an object moving in the environment in which wireless communication is executed. Thus, for example, in a case where the transmission device 10 moves at the speed of 1 [m/s], and the frequency of the wireless signal is 400 [MHz], the Doppler frequency $f_d$ is 2 [Hz] or less.

Accordingly, in such a case, in a case where the transmission device 10 transmits the wireless signal every time when 200 [ms] elapses, the reception device 20 can acquire the Doppler frequency $f_d$ with sufficiently high accuracy.

However, in a case where the frequency of the wireless signal is 2.4 [GHz], there are cases where the Doppler frequency $f_d$ is a value close to 10 [Hz]. In such a case, it is suitable to shorten the transmission period of the wireless signal that is executed by the transmission device 10 to about 50 [ms]. In addition, in such a case, it is suitable to reduce the amount of data transferred through the transmission of the wireless signal that is executed once.

Figure 6:
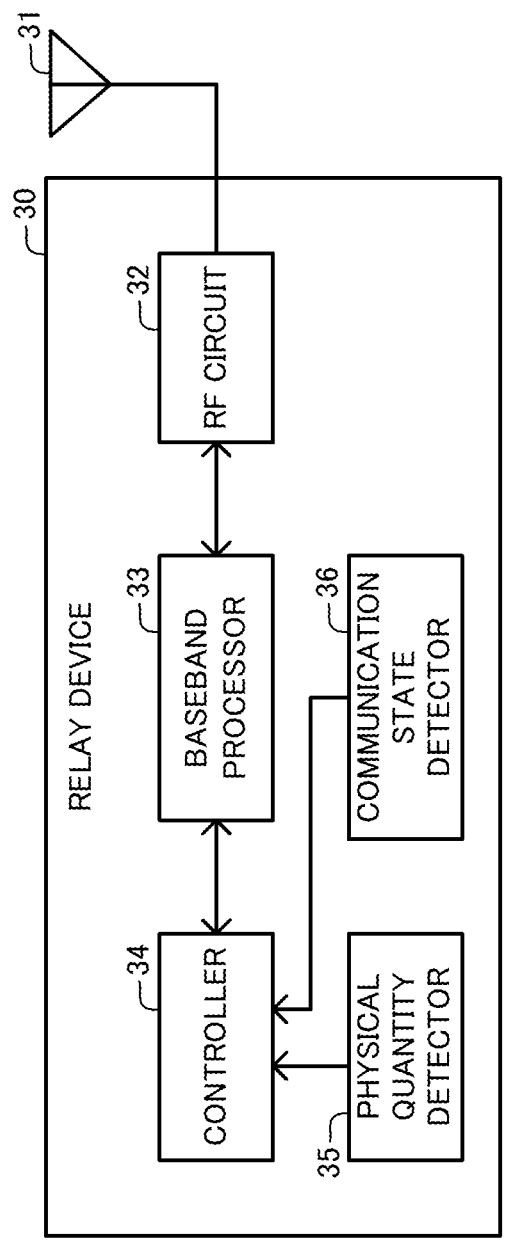
FIG. 6 is a diagram that illustrates the configuration of a relay device as an example of the first embodiment.

As illustrated in FIG. 6, the relay device 30 includes an antenna 31, an RF circuit 32, a baseband processor 33, a controller 34, a physical quantity detector 35, and a communication state detector 36. The configurations of the antenna 31, the RF circuit 32, and the baseband processor 33 are respectively similar to those of the antenna 11, the RF circuit 12, and the baseband processor 13.

The physical quantity detector 35 detects (measures) a physical quantity. In this example, the physical quantity detector 35 is an $SpO_2$ sensor. In other words, the physical quantity detector 35 detects an amount of oxygen contained in the blood as the physical quantity. Every time when the physical quantity is detected, the physical quantity detector 35 outputs physical quantity information representing the detected physical quantity to the controller 34.

In this example, every time when a second detection period set in advance elapses, the physical quantity detector 35 detects the physical quantity. Alternatively, the physical quantity detector 35 may be configured to detect the physical quantity every time when the relay device 30 receives a certain detection request. In this example, the length of the second detection period is the same as that of the first detection period. Alternatively, the second detection period may have a length different from that of the first detection period.

In this example, the amount of data of the physical quantity information output by the physical quantity detector 35 every unit time is 10 bits per second (bps).

The controller 34 transmits a data signal that is a wireless signal representing the detected physical quantity to the reception device 20 by outputting a transmission signal including the physical quantity information output by the physical quantity detector 35 to the baseband processor 33.

In this example, every time when third transmission timing comes, the controller 34 executes transmission of the data signal. In this example, the third transmission timing is timing that comes repeatedly every time when the second detection period elapses. In other words, the controller 34 repeatedly executes the transmission of the data signal.

The communication state detector 36 detects a communication state of the wireless communication system 1. In this example, the communication state detector 36 is a three-axis acceleration sensor. In other words, the communication state detector 36 detects acceleration in three axial directions that are orthogonal to each other as a parameter representing the communication state.

In a case where the acceleration detected by the communication state detector 36 is higher than certain threshold acceleration, a probability that the direct communication is not executable due to a change in the patient's posture is relatively high. Thus, in this example, in a case where the acceleration detected by the communication state detector 36 is higher than the threshold acceleration, the controller 34 determines that the communication state is changed to a state in which the direct communication is not executable.

Thus, in a case where the acceleration detected by the communication state detector 36 is higher than the threshold acceleration, the controller 34 outputs a transmission signal to the baseband processor 33 so as to transmit a POLL signal to the transmission device 10. In other words, the POLL signal can be regarded as a signal used for notifying the transmission device 10 that a device (here, the relay device 30) capable of relaying a wireless signal to the reception device 20 is present.

In a case where a wireless signal transmitted by the transmission device 10 is received, when the received wireless signal includes the information representing the execution of the indirect communication, the controller 34 outputs a transmission signal to the baseband processor 23 so as to transmit the received wireless signal to the reception device 20.

On the other hand, in a case where a wireless signal transmitted by the transmission device 10 is received, when the received wireless signal includes the information representing the execution of the direct communication, the controller 34 does not transmit the received wireless signal.

In this example, in a period from the reception of the ACK signal to a time point when the third transmission timing comes, the controller 34 sets the state of the relay device 30 to a sleep state. The sleep state is a state in which the power consumption of the relay device 30 is lower than that of a normal state. For example, in the normal state, the relay device 30 supplies power to all the circuits constituting the relay device 30. On the other hand, in the sleep state, the relay device 30 supplies power to only some of the circuits.

In this example, in a period from the transmission of the POLL signal to a time point when a certain relay standby time elapses after the transmission of the POLL signal, the controller 34 sets the state of the relay device 30 to the normal state. Accordingly, it can be avoided that the state of the relay device 30 is set to the sleep state when the transmission device 10 executes the indirect communication.

(Operation)

Next, the operation of the wireless communication system 1 described above will be described with reference to FIGS. 7 to 9.

Figure 7:
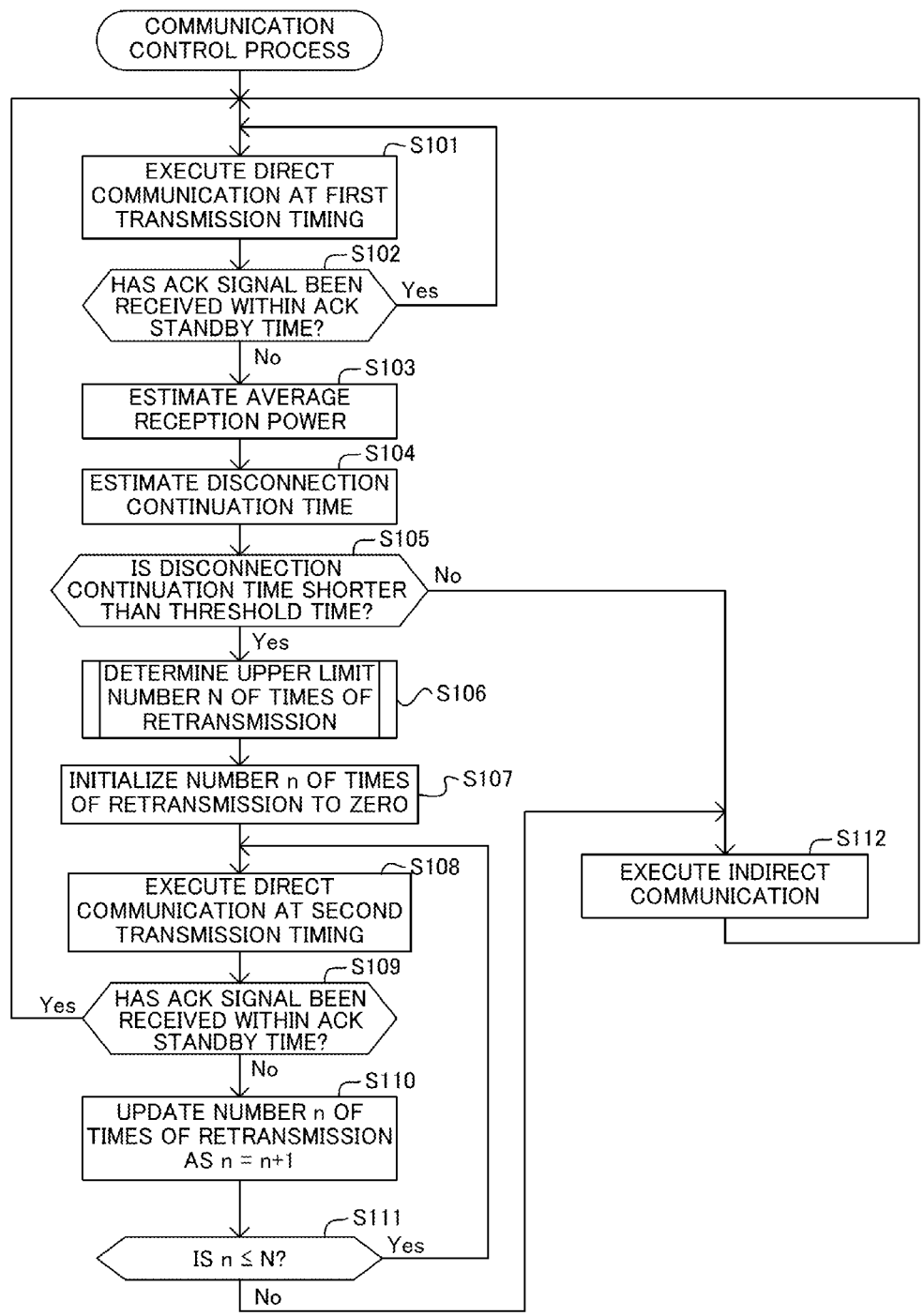
FIG. 7 is a flowchart that illustrates a communication control process executed by the transmission device as an example of the first embodiment.

The transmission device 10 is configured to execute a communication control process represented in a flowchart illustrated in FIG. 7 at certain timing after start of the operation of the transmission device 10. In addition, the transmission device 10 may be configured to execute the communication control process according to an input of an instruction from a user or reception of an instruction transmitted from an information processing device not illustrated in the figure.

First, the transmission device 10 executes the direct communication at the first transmission timing (step S101 illustrated in FIG. 7). In other words, the transmission device 10 detects a physical quantity (step A101 illustrated in FIG. 8) and directly transmits a data signal representing the detected physical quantity to the reception device 20 not through the relay device 30 (step A102 illustrated in FIG. 8).

Next, until the ACK standby time elapses after the execution of the direct communication, the transmission device 10 determines whether or not an ACK signal for the direct communication has been received (step S102 illustrated in FIG. 7).

First, a case will be considered in which the execution of the direct communication is successful. In such a case, the reception device 20 acquires a Doppler frequency $f_d$ according to a change in the reception power based on the reception power (step A103 illustrated in FIG. 8). In addition, the reception device 20 transmits an ACK signal including the Doppler frequency information representing the acquired Doppler frequency $f_d$ to the transmission device 10 (step A104 illustrated in FIG. 8).

Accordingly, the transmission device 10 receives the ACK signal until the ACK standby time elapses after the execution of the direct communication. Thus, the transmission device 10 determines "Yes", is returned to step S101 illustrated in FIG. 7, and repeatedly executes the process of steps S101 and S102.

Thereafter, a case will be considered in which, as the patient changes the direction of his body, the communication channel between the transmission device 10 and the reception device 20 is blocked by the patient's body, and consequently, the execution of the direct communication fails. Also in such a case, when the first transmission timing comes, the transmission device 10 detects a physical quantity (step A105 illustrated in FIG. 8) and directly transmits a data signal representing the detected physical quality to the reception device 20 not through the relay device 30 (step A106 illustrated in FIG. 8).

According to the assumption described above, the reception device 20 does not receive the data signal transmitted by the transmission device 10. Alternatively, the power of the data signal received by the reception device 20 is lower than the threshold power $P_{th}$. In such a case, the reception device 20 does not transmit an ACK signal.

Figure 8:
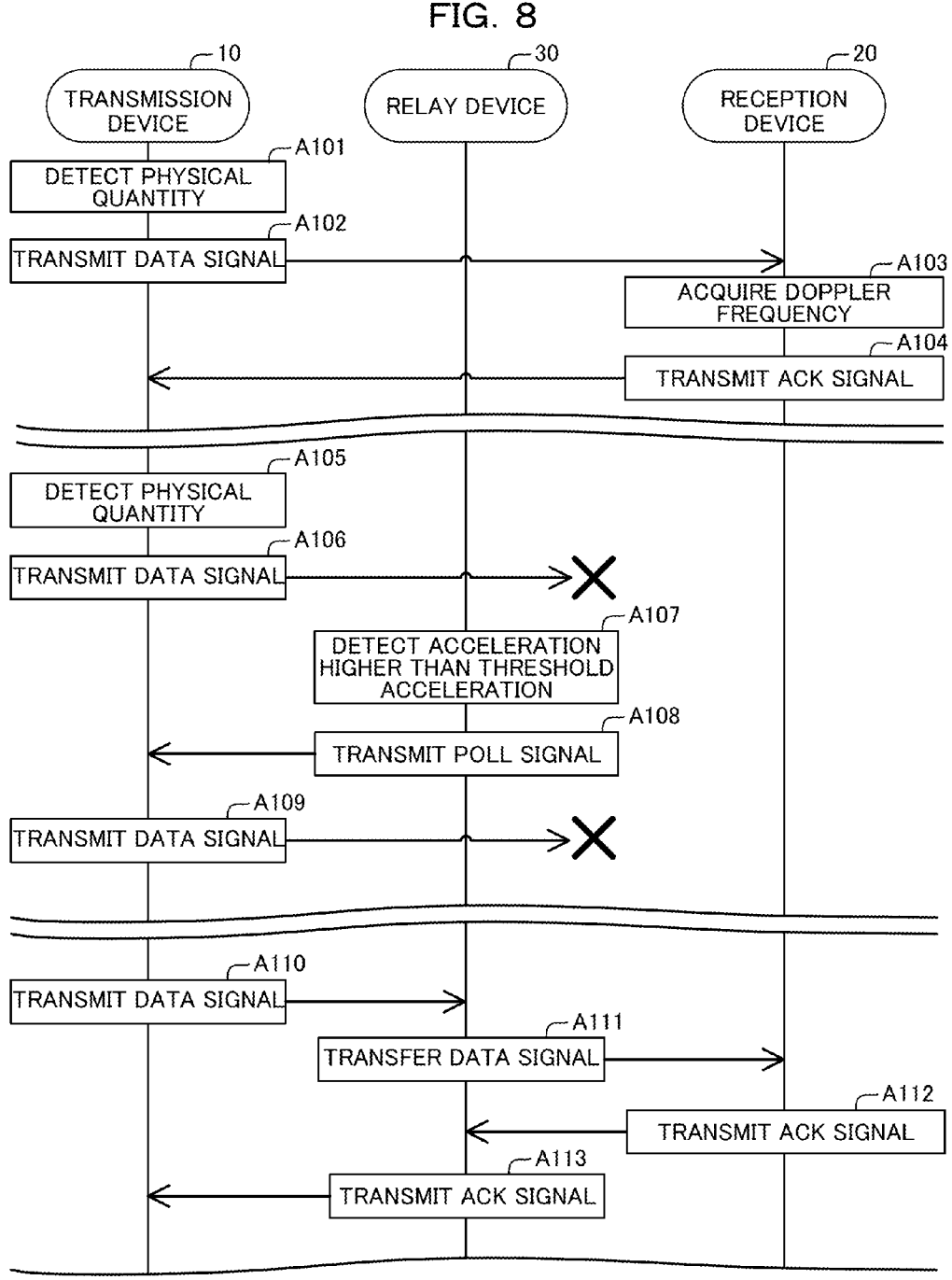
FIG. 8 is a sequence diagram that illustrates an example of the operation of a wireless communication system as an example of the first embodiment.

Meanwhile, the relay device 30 detects acceleration higher than the threshold acceleration according to the patient's operation (step A107 illustrated in FIG. 8). Then, the relay device 30 transmits a POLL signal to the transmission device 10 (step A108 illustrated in FIG. 8).

According to the assumption described above, the transmission device 10 can not receive the ACK signal until the ACK standby time elapses after the execution of the direct communication. Accordingly, in this case, the transmission device 10 determines "No" in step S102 illustrated in FIG. 7 and proceeds to step S103.

Then, the transmission device 10 estimates the average reception power $P_{rave}$ based on the reception power for a certain period including a time point at which the direct communication becomes not executable and a change rate of the reception power with respect to time for the period. Next, the transmission device 10 estimates the disconnection continuation time based on the Doppler frequency $f_d$ represented by the Doppler frequency information included in the latest ACK signal received in step S102 illustrated in FIG. 7 and the estimated average reception power $P_{rave}$ (step S104 illustrated in FIG. 7).

Then, the transmission device 10 determines whether or not the estimated disconnection continuation time is shorter than the threshold time (step S105 illustrated in FIG. 7).

In a case where the estimated disconnection continuation time is longer than the threshold time, the transmission device 10 determines "No", proceeds to step S112, and executes the indirect communication. In other words, the transmission device 10 indirectly retransmits the data signal transmitted in the direct communication of which execution has failed to the reception device 20 through the relay device 30. In a case where the execution of the indirect communication is successful, the reception device 20 transmits an ACK signal to the transmission device 10 through the relay device 30.

Thereafter, the transmission device 10 is returned to step S101 illustrated in FIG. 7 and repeatedly executes the process of steps S101 to S112.

On the other hand, in a case where the estimated disconnection continuation time is shorter than the threshold time, the transmission device 10 determines "Yes" and proceeds to step S106. In order to determine the upper limit number N of times of retransmission, the transmission device 10 executes an upper limit number of times of retransmission determining process illustrated in FIG. 9 in step S106 illustrated in FIG. 7. The upper limit number of times of retransmission determining process will be described later in detail.

After determining the upper limit number N of times of retransmission, the transmission device 10 initializes the number n of times of retransmission (in this example, sets to "0" as an initial value) (step S107 illustrated in FIG. 7). Next, the transmission device 10 executes the direct communication at the second transmission timing (step S108 illustrated in FIG. 7). In other words, the transmission device 10 directly retransmits the data signal transmitted in the direct communication of which execution has failed to the reception device 20 not through the relay device 30 (step A109 illustrated in FIG. 8).

Next, the transmission device 10 determines whether or not an ACK signal for the direct communication has been received until the ACK standby time elapses after the execution of the direct communication (step S109 illustrated in FIG. 7).

First, a case will be considered in which the execution of the direct communication is successful. In such a case, the reception device 20 transmits an ACK signal to the transmission device 10. Accordingly, the transmission device 10 receives an ACK signal until the ACK standby time elapses after the execution of the direct communication. Thus, the transmission device 10 determines "Yes", is returned to step S101 illustrated in FIG. 7, and repeatedly executes the process of steps S101 to S112.

On the other hand, a case will be considered in which the execution of the direct communication fails. In such a case, the reception device 20 does not transmit an ACK signal. For this reason, the transmission device 10 can not receive an ACK signal until the ACK standby time elapses after the execution of the direct communication. Accordingly, in this case, the transmission device 10 determines "No" in step S109 illustrated in FIG. 7 and proceeds to step S110.

Then, the transmission device 10 updates the number n of times of retransmission by adding "1" to the number n of times of retransmission (step S110 illustrated in FIG. 7). Next, the transmission device 10 determines whether or not the number n of times of retransmission the upper limit number N of times of retransmission or less (step S111 illustrated in FIG. 7).

In a case where the number n of times of retransmission is the upper limit number N of times of retransmission or less, the transmission device 10 determines "Yes", is retuned to step S108 illustrated in FIG. 7, and repeats the process of steps S108 to S111 until the number n of times of retransmission is larger than the upper limit number N of times of retransmission.

On the other hand, in a case where the number n of times of retransmission is larger than the upper limit number N of times of retransmission or less, the transmission device 10 determines "No", proceeds to step S112 illustrated in FIG. 7, and executes the indirect communication. In other words, the transmission device 10 indirectly retransmits the data signal transmitted in the direct communication of which execution has failed to the reception device 20 through the relay device 30. For example, the transmission device 10 transmits the data signal to the relay device 30 (step A110 illustrated in FIG. 8), and the relay device 30 transfers (relays) the received data signal to the reception device 20 (step A111 illustrated in FIG. 8). In a case where the execution of the indirect communication is successful, the reception device 20 transmits an ACK signal to the relay device 30 (step A112 illustrated in FIG. 8). Accordingly, when the ACK signal is received from the reception device 20, the relay device 30 transmits the ACK signal to the transmission device 10 (step A113 illustrated in FIG. 8).

Thereafter, the transmission device 10 is returned to step S101 illustrated in FIG. 7 and repeatedly executes the process of steps S101 to S112.

Next, the upper limit number of times of retransmission determining process will be described in detail with reference to FIG. 9.

First, the transmission device 10 acquires an SNR for the reception device 20 based on the power of the ACK signal received from the reception device 20. In addition, the transmission device 10 acquires an SNR for the relay device 30 based on the power of the POLL signal received from the relay device 30 (step S201 illustrated in FIG. 9).

Figure 9:
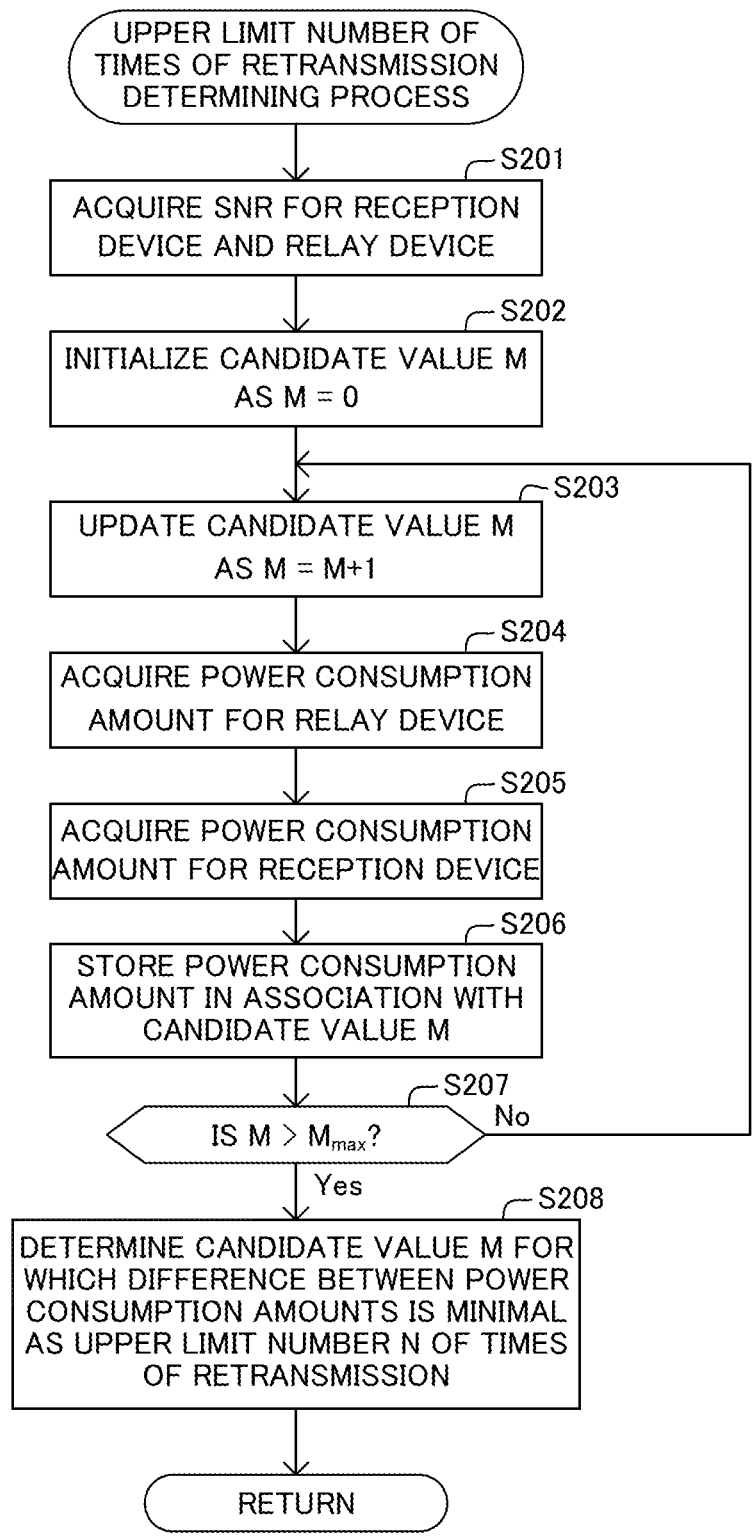
FIG. 9 is a flowchart that illustrates an upper limit number of times of retransmission determining process executed by the transmission device as an example of the first embodiment.

Next, the transmission device 10 initializes the candidate value M that is a candidate for the upper limit number of times of retransmission (in this example, sets to "0" as an initial value) (step S202 illustrated in FIG. 9). Next, the transmission device 10 updates the candidate value M by adding "1" to the candidate value M (step S203 illustrated in FIG. 9).

Then, the transmission device 10 acquires the power consumption (first power consumption) of the relay device 30 based on the SNR for the relay device 30, which has been acquired in step S201, and the candidate value M (step S204 illustrated in FIG. 9). In addition, the transmission device 10 acquires the power consumption (second power consumption) of the reception device 20 based on the SNR for the reception device 20, which has been acquired in step S201, and the candidate value M (step S205 illustrated in FIG. 9).

Next, the transmission device 10 stores the first power consumption acquired in step S204, the second power consumption acquired in step S205, and the candidate value M in association with each other (step S206 illustrated in FIG. 9). Then, the transmission device 10 determines whether or not the candidate value M is larger than the upper limit candidate value $M_{max}$ (step S207 illustrated in FIG. 9).

In a case where the candidate value M is the upper limit candidate value $M_{max}$ or less, the transmission device 10 determines "No", is returned to step S203 illustrated in FIG. 9, and repeatedly executes the process of steps S203 to S207 until the candidate value M is larger than the upper limit candidate value $M_{max}$. In this way, for each of a plurality of candidate values from the lower limit candidate value "1" to the upper limit candidate value $M_{max}$, the transmission device 10 acquires the first power consumption and the second power consumption of a case where the upper limit number of times of retransmission is assumed to be the candidate value.

On the other hand, in a case where the candidate value M is larger than the upper limit candidate value $M_{max}$, the transmission device 10 determines "Yes" in step S207 illustrated in FIG. 9 and proceeds to step S208. Then, the transmission device 10 determines a candidate value among the stored candidate values for which a difference between the first power consumption and the second power consumption associated with the candidate value is minimal as the upper limit number N of times of retransmission (step S208 illustrated in FIG. 9). Then, the transmission device 10 ends the upper limit number of times of retransmission determining process.

In this way, the power consumption of the relay device 30 and the power consumption of the transmission device 10 can sufficiently approach each other. In addition, in this way, a time point at which the operation of the relay device 30 is not continuously executable and a time point at which the operation of the transmission device 10 is not continuously executable can sufficiently approach each other.

As described above, in a case where the direct communication becomes not executable while the direct communication is repeatedly executed, the wireless communication system 1 according to the first embodiment estimates the disconnection continuation time. In addition, in such a case, in a case where the disconnection continuation time is shorter than a certain threshold time, the wireless communication system 1 continues to execute the direct communication. On the other hand, in a case where the disconnection continuation time is longer than the threshold time, the wireless communication system 1 executes the indirect communication.

Accordingly, unnecessary execution of the indirect communication can be prevented. In other words, according to the configuration described above, it can be avoided that the power consumption of the relay device 30 becomes excessively high while a time during which a wireless signal can not be received from the transmission device 10 by the reception device 20 is shortened.

In addition, the wireless communication system 1 according to the first embodiment estimates the disconnection continuation time based on the Doppler frequency of a wireless signal received by the reception device 20 and an average value of the reception power that is the power of the wireless signal received by the reception device 20.

The Doppler frequency and the average value of the reception power represent the disconnection continuation time well. Thus, by configuring the wireless communication system 1 as described above, the disconnection continuation time can be estimated with high accuracy.

Furthermore, the wireless communication system 1 according to the first embodiment calculates an average fade duration based on the Doppler frequency of a wireless signal received by the reception device 20 and an average value of the reception power that is the power of the wireless signal received by the reception device 20. In addition, the wireless communication system 1 uses the calculated average fade duration as the estimated disconnection continuation time.

The average fade duration represents the disconnection continuation time well. Thus, by configuring the wireless communication system 1 as described above, the disconnection continuation time can be estimated with high accuracy.

In addition, in a case where the disconnection continuation time is shorter than the threshold time, the wireless communication system 1 according to the first embodiment repeatedly executes the retransmission process when the number of times of retransmission is the certain upper limit number of times of retransmission or less.

Also in a case where the disconnection continuation time is shorter than the threshold time, there are cases where the execution of the retransmission process repeatedly fails. In such cases, even when the retransmission process is further executed after repeatedly executing the retransmission process for the upper limit number of times of retransmission, the possibility of successful execution of the retransmission process is relatively low. Accordingly, by configuring the wireless communication system 1 as described above, unnecessary repeated execution of the retransmission process can be avoided.

In addition, for each of a plurality of candidate values, the wireless communication system 1 according to the first embodiment estimates the first power consumption, which is the amount of power consumed by the relay device 30, and the second power consumption, which is the amount of power consumed by the transmission device 10, of a case where the upper limit number of times of retransmission is the candidate value. Furthermore, the wireless communication system 1 determines a candidate value for which a difference between the first power consumption and the second power consumption is minimal as the upper limit number of times of retransmission.

In this way, the power consumption of the relay device 30 and the power consumption of the transmission device 10 can sufficiently approach each other. In addition, in this way, a time point at which the operation of the relay device 30 is not continuously executable and a time point at which the operation of the transmission device 10 is not continuously executable can sufficiently approach each other.

In addition, in a case where the number of times of retransmission is larger than the upper limit number of times of retransmission, the wireless communication system 1 according to the first embodiment executes the indirect communication.

Accordingly, also in a case where the execution of the direct communication is not successful even when the retransmission process is repeatedly executed for the upper limit number of times of retransmission, a wireless signal can be reliably transferred from the transmission device 10 to the reception device 20.

In addition, in the wireless communication system 1 according to the first embodiment, each of the transmission device 10 and the relay device 30 detects a physical quantity and transmits a wireless signal representing the detected physical quantity to the reception device 20.

Accordingly, the power consumption of the relay device 30 is reduced, and thus, a case can be avoided in which the operation of the relay device 30 is continuously not executable at a time point that is considerably before that of the transmission device 10. As a result, the physical quantity detected by each of the transmission device 10 and the relay device 30 can be transferred to the reception device 20 more reliably.

In addition, the wireless communication system 1 according to the first embodiment constitutes a BAN.

In the BAN, there are many cases in which a time allowed as a time during which the reception device 20 can not receive a wireless signal from the transmission device 10 is relatively short. However, in a case where the operation of the relay device 30 becomes continuously not executable at a time point that is considerably before that of the transmission device 10, the indirect communication can not be executed. Thus, in the BAN, in a case where the power consumption of the relay device 30 is excessively high, the possibility that the reception device 20 can not receive a wireless signal from the transmission device 10 is relatively high.

In contrast to this, by configuring the wireless communication system 1 as described above, the power consumption of the relay device 30 is reduced, while a time during which the reception device 20 can not receive a wireless signal from the transmission device 10 is shortened, whereby the function of the BAN can be appropriately realized.

Figure 10:
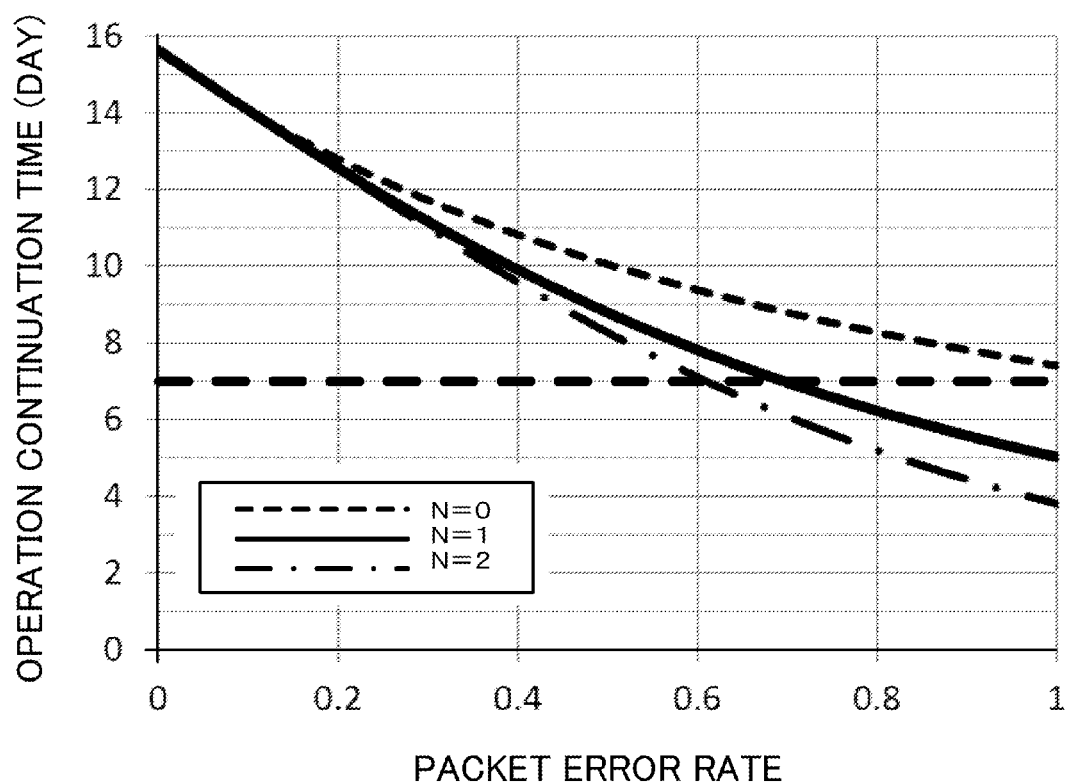
FIG. 10 is a graph that illustrates an example of a change in the operation continuation time of the transmission device with respect to a packet error rate of communication between the transmission device and the reception device.
Figure 11:
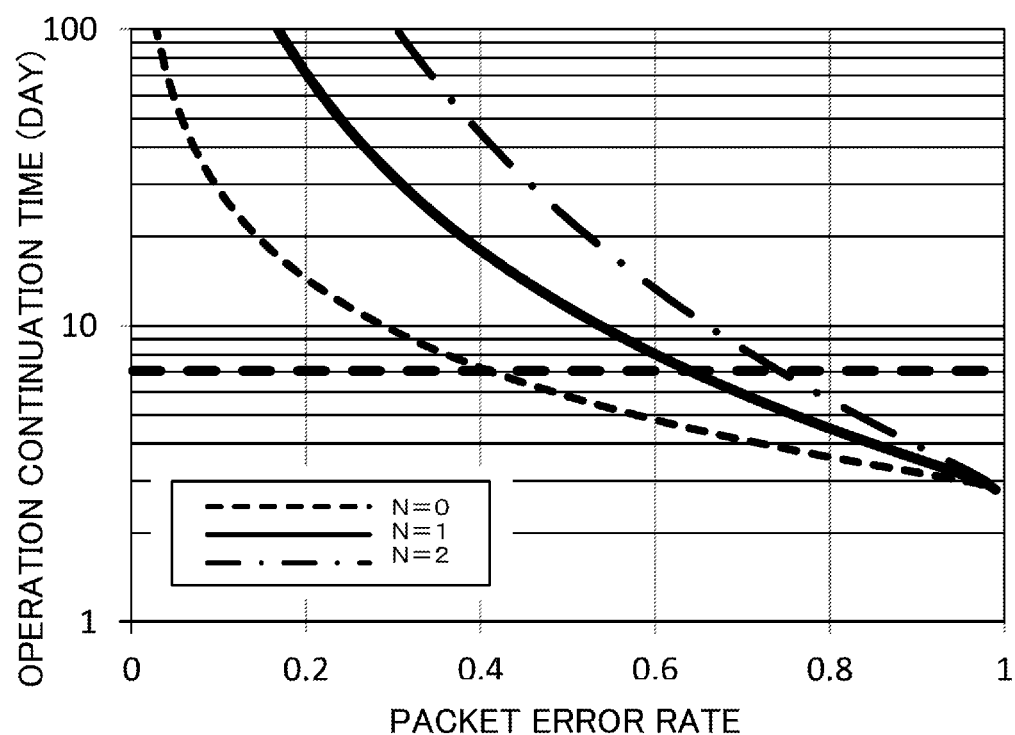
FIG. 11 is a graph that illustrates an example of a change in the operation continuation time of the relay device with respect to a packet error rate of communication between the transmission device and the reception device.

Here, an example of the operation continuation time in the wireless communication system 1 according to the first embodiment will be described with reference to FIGS. 10 and 11. FIG. 10 is a graph that illustrates an example of a change in the operation continuation time of the transmission device 10 with respect to a packet error rate of the communication between the transmission device 10 and the reception device 20. FIG. 11 is a graph that illustrates an example of a change in the operation continuation time of the relay device 30 with respect to a packet error rate of the communication between the transmission device 10 and the reception device 20. The operation continuation time of the transmission device 10 is a time during which the transmission device 10 can continue the operation (in other words, a time during which the battery included in the transmission device 10 can supply power for operating the transmission device 10). The operation continuation time of the relay device 30 is a time during which the relay device 30 can continue the operation.

FIGS. 10 and 11 illustrate changes in the operation continuation time of a case where the upper limit number N of times of retransmission is "0", "1", and "2" (N=0, 1, 2). Here, each of the power consumption for each transmission process of the transmission device 10, the power consumption for each reception process of the relay device 30, and the power consumption for each transmission process of the relay device 30 is assumed to be 20 [mA]. In addition, the capacity of the battery included in each of the transmission device 10 and the relay device 30 is assumed to be 75 [mAh].

In addition, the packet error rate of the communication between the transmission device 10 and the relay device 30 is assumed to be "0.1". In addition, the packet error rate of the communication between the relay device 30 and the reception device 20 is assumed to be "0". As the packet error rate of the communication between the relay device 30 and the reception device 20 increases from "0", the retransmission of a data signal from the relay device 30 to the reception device 20 occurs more frequently, and accordingly, the operation continuation time of the relay device 30 is further shortened.

As illustrated in FIG. 10, in a case where the upper limit number N of times of retransmission is "0", even when the packet error rate is "1", the operation continuation time of the transmission device 10 is over seven days. In other words, also in a case where the packet error rate is relatively high, in a case where the indirect communication is executed immediately when the execution of the direct communication fails, the operation continuation time of the transmission device 10 is over seven days.

On the other hand, as illustrated in FIG. 11, in a case where the upper limit number N of times of retransmission is "0", the packet error rate for which the operation continuation time of the relay device 30 is over seven days is about 0.4. In other words, in an environment in which the packet error rate exceeds "0.4", the operation of the relay device 30 becomes not executable before that of the transmission device 10. Thus, in such a case, the wireless communication system 1 can maintain the function of the wireless communication system 1 over seven days.

In addition, in a case where the upper limit number N of times of retransmission is "1", the packet error rate for which the operation continuation time of the transmission device 10 is seven days and the packet error rate for which the operation continuation time of the relay device 30 is seven days are closest to each other. The packet error rate for which the operation continuation time of the relay device 30 is seven days is slight lower than the packet error rate for which the operation continuation time of the transmission device 10 is seven days and is about 0.65. Accordingly, in this case, in an environment in which the packet error rate is less than "0.65", the wireless communication system 1 can maintain the function of the wireless communication system 1 for seven days.

In addition, in a case where the upper limit number N of times of retransmission is "2", the packet error rate for which the operation continuation time of the transmission device 10 is seven days is about 0.6. On the other hand, the packet error rate for which the operation continuation time of the relay device 30 is seven days is about 0.74. Accordingly, in this case, in an environment in which the packet error rate is less than "0.6", the wireless communication system 1 can maintain the function of the wireless communication system 1 for seven days.

As described above, in a case where the upper limit number N of times of retransmission is "1", a condition that the function of the wireless communication system 1 is maintained for seven days for a highest packet error rate can be satisfied.

In addition, while the wireless communication system 1 according to the first embodiment determines the upper limit number of times of retransmission such that a difference between the power consumption of the transmission device 10 and the power consumption of the relay device 30 is minimal, the upper limit number of times of retransmission set in advance may be configured to be used.

Furthermore, the relay device 30 according to the first embodiment is configured to transmit a POLL signal in a case where acceleration higher than the threshold acceleration is detected. However, in the wireless communication system 1, the transmission device 10 may be configured to transmit a POLL signal in a case where an ACK signal has not been received until the ACK standby time elapses after the execution of the direct communication.

In such a case, it is suitable to configure the relay device 30 to transmit a response signal to the transmission device 10 in a case where a POLL signal is received from the transmission device 10. In such a case, the response signal may be regarded as a signal used for notifying the transmission device 10 that a device (here, the relay device 30) capable of relaying a wireless signal to the reception device 20 is present.

In addition, the transmission device 10 according to the first embodiment uses the average fade duration as the disconnection continuation time. However, it may be configured such that the transmission device 10 includes an acceleration sensor and estimates the disconnection continuation time based on the acceleration detected by the acceleration sensor. In such a case, it is suitable for the transmission device 10 to estimate a value that increases as the detected acceleration increases as the disconnection continuation time.

Furthermore, the transmission device 10 according to the first embodiment is configured to execute the direct communication when the process proceeds to step S101 after the execution of the indirect communication in step S112 illustrated in FIG. 7. However, the transmission device 10 may be configured to execute the indirect communication instead of the direct communication in step S101 until a certain indirect communication maintenance time elapses after the execution of the indirect communication in step S112.

In addition, the transmission device 10 according to the first embodiment is configured to execute the indirect communication when the disconnection continuation time and the threshold time are the same in a case where the direct communication becomes not executable while the direct communication is repeatedly executed. However, the transmission device 10 may be configured to continue to execute the direct communication when the disconnection continuation time and the threshold time are the same in a case where the direct communication becomes not executable while the direct communication is repeatedly executed.

Furthermore, the relay device 30 according to the first embodiment transfers the data signal received from the transmission device 10 to the reception device 20. However, the relay device 30 may be configured to execute the retransmission process in a case where the transmission of the data signal to the reception device 20 fails.

In addition, the transmission device 10 according to the first embodiment is configured to estimate the average reception power based on the reception power during a certain period including the time point at which the direct communication becomes not executable and a change rate of the reception power with respect to time during the period.

However, the transmission device 10 may be configured to include an acceleration sensor (for example, a three-axis acceleration sensor) and estimate the average reception power based on the detected acceleration and the reception power at the time point at which the direct communication becomes not executable. In addition, the transmission device 10 may be configured to estimate the average reception power based on the detected acceleration, the reception power during a certain period before the time point at which the direct communication becomes not executable, and the change rate of the reception power with respect to time during the period. In such a case, it is suitable for the transmission device 10 to estimate a value that decreases as the detected acceleration increases as the average reception power.

Second Embodiment

Next, a wireless communication system according to a second embodiment of the present disclosure will be described. The wireless communication system according to the second embodiment is different from the wireless communication system according to the first embodiment described above in that the upper limit number of times of retransmission is determined such that a difference between the operation continuation time of a relay device and the operation continuation time of a transmission device is minimal. Hereinafter, such a difference will be focused in description. In the description of the second embodiment, a member to which the same reference sign as that of the first embodiment is assigned is the same or almost the same as that of the first embodiment.

Figure 12:
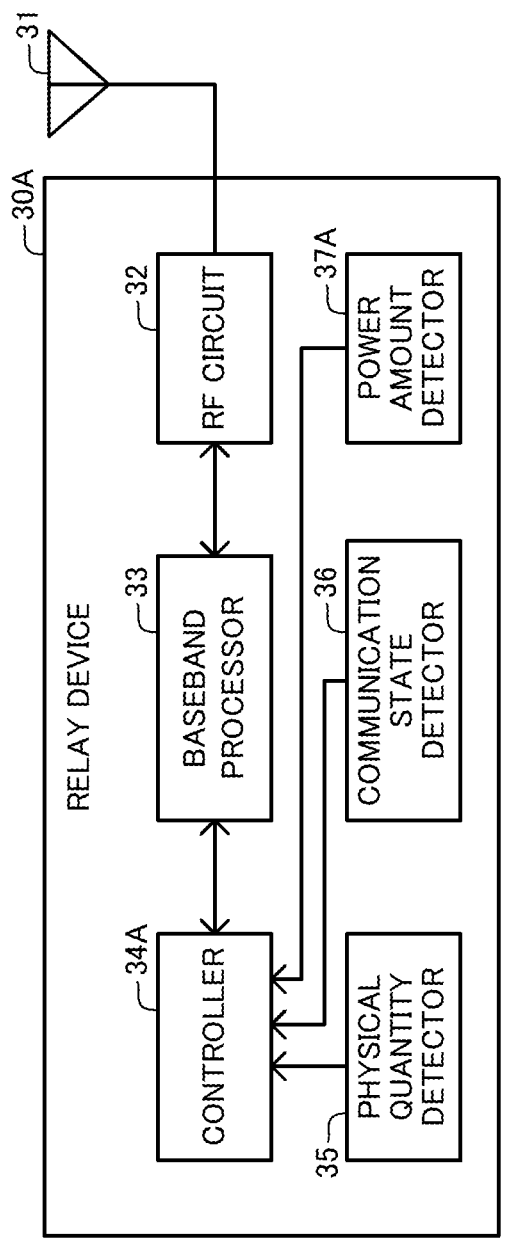
FIG. 12 is a diagram that illustrates the configuration of a relay device as an example of a second embodiment.

As illustrated in FIG. 12, a relay device 30A according to the second embodiment includes a controller 34A instead of the controller 34 according to the first embodiment. In addition, the relay device 30A includes a power detector 37A.

The power detector 37A detects the amount of power (remaining power) that can be supplied by a battery included in the relay device 30A. The power detector 37A outputs remaining power information representing the detected remaining power to the controller 34A.

The controller 34A outputs a transmission signal to a baseband processor 33 so as to transmit the remaining power information output by the power detector 37A together when a POLL signal is transmitted. In this example, the POLL signal includes the remaining power information. In addition, the relay device 30A may be configured to transmit the remaining power information as a wireless signal other than the POLL signal.

Figure 13:
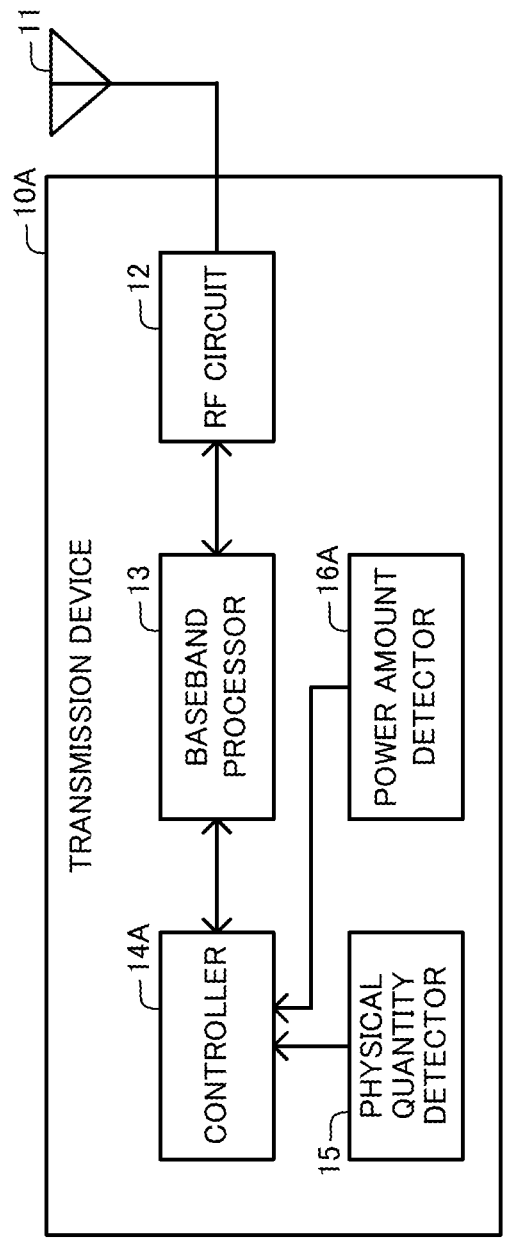
FIG. 13 is a diagram that illustrates the configuration of a transmission device as an example of the second embodiment.

As illustrated in FIG. 13, a transmission device 10A according to the second embodiment includes a controller 14A instead of the controller 14 according to the first embodiment. In addition, the transmission device 10A includes a power detector 16A.

The power detector 16A detects the amount of power (remaining power) that can be supplied by a battery included in the transmission device 10A. The power detector 16A outputs remaining power information representing the detected remaining power to the controller 14A.

The controller 14A is different from the controller 14 in the function for determining the upper limit number of times of retransmission. Thus, the function of the controller 14A other than the function for determining the upper limit number of times of retransmission is the same as that of the controller 14.

For each of a plurality of candidate values, the controller 14A estimates a first operation continuation time and a second operation continuation time of a case where the upper limit number of times of retransmission is assumed to be the candidate value. The first operation continuation time is a time during which the relay device 30A can continue the operation. The second operation continuation time is a time during which the transmission device 10A can continue the operation.

In this example, the candidate values are natural numbers starting from a lower limit candidate value 1 to an upper limit candidate value $M_{max}$. Here, it is suitable to set the upper limit candidate value $M_{max}$ in advance based on the allowed delay time and the retransmission period.

Then, the controller 14A determines a candidate value for which a difference between the first operation continuation time and the second operation continuation time is minimal as the upper limit number of times of retransmission.

For example, the controller 14A, similar to the controller 14, estimates first power consumption and second power consumption.

Then, the controller 14A calculates a value acquired by subtracting a value, which is acquired by multiplying the remaining power represented by the remaining power information included in the POLL signal received from the relay device 30A by a first detection period, from the estimated first power consumption and estimates the calculated value as the first operation continuation time.

Similarly, the controller 14A calculates a value acquired by subtracting a value, which is acquired by multiplying the remaining power represented by the remaining power information output from the power detector 16A by the first detection period, from the estimated second power consumption and estimates the calculated value as the second operation continuation time.

The wireless communication system 1 configured as above operates similar to the wireless communication system 1 according to the first embodiment.

As described above, according to the wireless communication system 1 of the second embodiment, the same operations and advantages as those of the wireless communication system 1 according to the first embodiment can be acquired.

In addition, for each of the plurality of candidate values, the wireless communication system 1 according to the second embodiment estimates the first operation continuation time and the second operation continuation time of a case where the upper limit number of times of retransmission is assumed to be the candidate value. Furthermore, the wireless communication system 1 determines a candidate value for which a difference between the first operation continuation time and the second operation continuation time is minimal as the upper limit number of times of retransmission.

In this way, the operation continuation time of the relay device 30A and the operation continuation time of the transmission device 10A can sufficiently approach each other. In addition, in this way, a time point at which the operation of the relay device 30A is not continuously executable and a time point at which the operation of the transmission device 10A is not continuously executable can sufficiently approach each other.

As above, while the present disclosure has been described with reference to the embodiments, the present disclosure is not limited to the embodiments described above. In the configuration and details of the present disclosure, various changes that can be understood by those skilled in the art may be made within the scope of the present disclosure.

In addition, the physical quantity detected by each device may be a physical quantity (for example, temperature, humidity, acceleration, illuminance, a wind direction, wind velocity, a seismic motion, a rainfall, loudness of sound, a water level, power consumption, water consumption, gas consumption, or the like) other than the biological information.

Furthermore, the wireless communication system may include a plurality of sub systems. Each sub system has a configuration that is similar to that of the wireless communication system according to the first embodiment or the second embodiment. In addition, each sub system is configured to execute wireless communication at a frequency that is inherent in the sub system.

In such a case, the wireless communication system may be configured such that, when a transmission device of a first sub system can not execute indirect communication, the transmission device of the first sub system transmits a data signal to each device of a second sub system. Here, the first sub system is one of the plurality of sub systems, and the second sub system is another one of the plurality of sub systems.

In addition, in such a case, it is suitable for each device of the second sub system to transmit a data signal to a reception device of the first sub system in a case where the data signal is received from the transmission device of the first sub system. Alternatively, in a case where a data signal is received from the transmission device of the first sub system, the reception device of the second sub system may be configured to execute a process (for example, a process for outputting an alarm) based on the data signal instead of the reception device of the first sub system.

However, the plurality of sub systems have mutually-different frequencies used for executing wireless communication. Thus, it is suitable for the reception device of each sub system to arrange a period during which communication at a frequency used by the other sub system (for example, adjacently arranged) is executable.

For example, the reception device of the second sub system, in a case where a wireless signal requesting communication is received from the reception device of the first sub system, executes control such that communication at a frequency (first frequency) used by the first sub system is executable during a period in which communication with each device of the second sub system is not executed. Alternatively, the reception device of the second sub system, in a case where a wireless signal requesting communication is received from the reception device of the first sub system, instructs each device of the second sub system to control communication at the first frequency so as to be executable during a period other than a period in which a data signal is transmitted from the reception device.

According to such a modification, even in a case where the transmission device of the first sub system can not execute indirect communication, a physical quantity detected by the transmission device of the first sub system can be transferred to at least one reception device of the wireless communication system.

In addition, in each embodiment described above, each function of each device is realized by hardware such as a circuit or the like. However, each device may be configured to include a computer that includes a processing device and a storage device storing a program (software) and realize each function by executing the program by using the processing device. In such a case, the program may be stored on a computer-readable recording medium. For example, the recording medium is a portable medium such as a flexible disk, an optical disc, a magneto-optical disk, or a semiconductor memory.

Furthermore, within a range not departing from the concept of the present disclosure, as another modification of the embodiment described above, an arbitrary combination of the embodiments and the modifications described above may be employed.

According to the wireless communication system that has been disclosed, it can be avoided that the power consumption of the relay device is excessively high while the time during which the reception device can not receive a wireless signal from the transmission device is shortened.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system that includes a transmission device, a relay device, and a reception device and is configured to execute direct communication of directly transmitting a wireless signal from the transmission device to the reception device without routing through the relay device and indirect communication of indirectly transmitting a wireless signal from the transmission device to the reception device through the relay device, the wireless communication system comprising:
a controller configured to estimate a disconnection continuation time that is a time during which the direct communication is not executable in a case where the direct communication is not executable while the direct communication is repeatedly executed, continue to execute the direct communication when the disconnection continuation time is shorter than a threshold time, and execute the indirect communication when the disconnection continuation time is longer than the threshold time.

2. The wireless communication system according to claim 1, wherein the controller is configured to estimate the disconnection continuation time based on a Doppler frequency of the wireless signal received by the reception device and an average value of reception power that is power of the wireless signal received by the reception device.

3. The wireless communication system according to claim 2, wherein the controller is configured to calculate an average fade duration based on the Doppler frequency of the wireless signal received by the reception device and an average value of reception power that is power of the wireless signal received by the reception device and use the calculated average fade duration as the estimated disconnection continuation time.

4. The wireless communication system according to claim 1, wherein the controller is configured to repeatedly execute a retransmission process when a retransmission number of times that is the number of times the retransmission process is repeatedly executed is an upper limit number of times of retransmission or less in a case where the disconnection continuation time is shorter than the threshold time, the retransmission process being of re-executing the direct communication when the execution of the direct communication fails.

5. The wireless communication system according to claim 4, wherein the controller is configured to estimate a first power consumption amount that is an amount of power consumed by the relay device and a second power consumption amount that is an amount of power consumed by the transmission device for each of a plurality of candidate values that are candidates for the upper limit number of times of retransmission in a case where the upper limit number of times of retransmission is assumed to be the each of the plurality of candidate values and determine the candidate value for which a difference between the first power consumption amount and the second power consumption amount is minimal as the upper limit number of times of retransmission.

6. The wireless communication system according to claim 4, wherein the controller is configured to estimate a first operation continuation time that is a time during which the relay device can operate and a second operation continuation time that is a time during which the transmission device can operate for each of a plurality of candidate values that are candidates for the upper limit number of times of retransmission in a case where the upper limit number of times of retransmission is assumed to be the each of the plurality of candidate values and determine the candidate value for which a difference between the first operation continuation time and the second operation continuation time is minimal as the upper limit number of times of retransmission.

7. The wireless communication system according to claim 4, wherein the controller is configured to execute the indirect communication in a case where the number of times of retransmission is more than the upper limit number of times of retransmission.

8. The wireless communication system according to claim 1, wherein each of the transmission device and the relay device is configured to detect a physical quantity and transmit the wireless signal representing the detected physical quantity to the reception device.

9. The wireless communication system according to claim 1, wherein the wireless communication system constitutes a body area network (BAN).

10. A wireless communication method used for controlling a wireless communication system that includes a transmission device, a relay device, and a reception device and is configured to execute direct communication of directly transmitting a wireless signal from the transmission device to the reception device without routing through the relay device and indirect communication of indirectly transmitting a wireless signal from the transmission device to the reception device through the relay device, the wireless communication method comprising:
estimating a disconnection continuation time that is a time during which the direct communication is not executable in a case where the direct communication is not executable while the direct communication is repeatedly executed; and
continuing to execute the direct communication when the disconnection continuation time is shorter than a threshold time and executing the indirect communication when the disconnection continuation time is longer than the threshold time.

11. The wireless communication method according to claim 10, further comprising estimating the disconnection continuation time based on a Doppler frequency of the wireless signal received by the reception device and an average value of reception power that is power of the wireless signal received by the reception device.

12. The wireless communication method according to claim 11, further comprising calculating an average fade duration based on the Doppler frequency of the wireless signal received by the reception device and an average value of reception power that is power of the wireless signal received by the reception device and using the calculated average fade duration as the estimated disconnection continuation time.

13. The wireless communication method according to claim 10, further comprising repeatedly executing a retransmission process when a retransmission number of times that is the number of times the retransmission process is repeatedly executed is an upper limit number of times of retransmission or less in a case where the disconnection continuation time is shorter than the threshold time, the retransmission process being of re-executing the direct communication when the execution of the direct communication fails.

14. The wireless communication method according to claim 13, further comprising:
estimating a first power consumption amount that is an amount of power consumed by the relay device and a second power consumption amount that is an amount of power consumed by the transmission device for each of a plurality of candidate values that are candidates for the upper limit number of times of retransmission in a case where the upper limit number of times of retransmission is assumed to be the each of the plurality of candidate values; and
determining the candidate value for which a difference between the first power consumption amount and the second power consumption amount is minimal as the upper limit number of times of retransmission.

15. The wireless communication method according to claim 13, further comprising:
estimating a first operation continuation time that is a time during which the relay device can operate and a second operation continuation time that is a time during which the transmission device can operate for each of a plurality of candidate values that are candidates for the upper limit number of times of retransmission in a case where the upper limit number of times of retransmission is assumed to be the each of the plurality of candidate values; and
determining the candidate value for which a difference between the first operation continuation time and the second operation continuation time is minimal as the upper limit number of times of retransmission.

16. The wireless communication method according to claim 13, further comprising executing the indirect communication in a case where the number of times of retransmission is more than the upper limit number of times of retransmission.

17. A transmission device configured to execute direct communication of directly transmitting a wireless signal to a reception device without routing through a relay device and indirect communication of transmitting a wireless signal to the relay device so as to indirectly transmit the wireless signal to the reception device through the relay device, the transmission device comprising:

a controller configured to estimate a disconnection continuation time that is a time during which the direct communication is not executable in a case where the direct communication is not executable while the direct communication is repeatedly executed, continue to execute the direct communication when the disconnection continuation time is shorter than a threshold time, and execute the indirect communication when the disconnection continuation time is longer than the threshold time.

18. A control method used for controlling a transmission device configured to execute direct communication of directly transmitting a wireless signal to a reception device without routing through a relay device and indirect communication of transmitting a wireless signal to the relay device so as to indirectly transmit the wireless signal to the reception device through the relay device, the control method comprising:

estimating a disconnection continuation time that is a time during which the direct communication is not executable in a case where the direct communication is not executable while the direct communication is repeatedly executed;

continuing to execute the direct communication when the disconnection continuation time is shorter than a threshold time and executing the indirect communication when the disconnection continuation time is longer than the threshold time.

19. A non-transitory computer-readable recording medium having stored therein a program for causing a computer to execute a process for controlling a transmission device configured to execute direct communication of directly transmitting a wireless signal to a reception device without routing through a relay device and indirect communication of transmitting a wireless signal to the relay device so as to indirectly transmit the wireless signal to the reception device through the relay device, the process comprising:

estimating a disconnection continuation time that is a time during which the direct communication is not executable in a case where the direct communication is not executable while the direct communication is repeatedly executed;

continuing to execute the direct communication when the disconnection continuation time is shorter than a threshold time and executing the indirect communication when the disconnection continuation time is longer than the threshold time.

* * * * *